(12) United States Patent
Fukushige et al.

(10) Patent No.: US 6,704,905 B2
(45) Date of Patent: Mar. 9, 2004

(54) TEXT CLASSIFYING PARAMETER GENERATOR AND A TEXT CLASSIFIER USING THE GENERATED PARAMETER

(75) Inventors: Yoshio Fukushige, Fujisawa (JP); Yuji Kanno, Yokohama (JP); Yasuki Iizuka, Yokohama (JP); Koichi Tamari, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 10 days.

(21) Appl. No.: 10/028,816

(22) Filed: Dec. 28, 2001

(65) Prior Publication Data

US 2002/0152051 A1 Oct. 17, 2002

(30) Foreign Application Priority Data

Dec. 28, 2000  (JP) ........................................ 2000-401947

(51) Int. Cl.[7] ........................ G06F 15/00; G06F 101/14; G06F 17/18
(52) U.S. Cl. ........................ 715/500; 707/200; 707/202; 707/203; 707/204; 707/206; 705/2; 705/3; 702/179
(58) Field of Search ........................ 702/179; 707/200, 707/100, 206, 202–204; 705/2, 3; 715/501.1, 500

(56) References Cited

U.S. PATENT DOCUMENTS 6,185,576 B1 * 2/2001 McIntosh .................... 707/200

FOREIGN PATENT DOCUMENTS

| JP | 7-295989 | 11/1995 |
| JP | 11-53394 | 2/1999 |
| JP | 2000-194723 | 7/2000 |

* cited by examiner

*Primary Examiner*—John Barlow
*Assistant Examiner*—Aditya Bhat
(74) *Attorney, Agent, or Firm*—Lowe Hauptman Gilman & Berner, LLP

(57) ABSTRACT

A method and system for generating a set of parameters for use in determining whether a given document belongs to a specified one of a plurality of predetermined categories. An evaluation sample selection screen enables an operator to interactively enter various command parameters for selecting documents for which the calculated membership scores are to be evaluated. In response to an input of one of the command parameters, information useful for the selection of documents is visually presented to the operator. An evaluation value input screen shows selected documents and permits the operator to enter an evaluation value to each of the displayed selected documents. The entered evaluation values are reflected to the reference vector of the specified category.

51 Claims, 34 Drawing Sheets

FIG. 4

FEATURE VECTOR $D_{11934}$ FOR
DOCUMENT ID $(D_i)=11934$

| COMPONENT No. (OR AXIS No.) $j$ | $j$-TH COMPONENT $a_{i,j}$ |
|---|---|
| 1 | 0.159713 |
| 2 | 0.004751 |
| ⋮ | ⋮ |
| 600 | 0.015522 |

FIG. 5

REFERENCE VECTOR $C_{234}$ FOR CATEGORY
C234 (e.g., "derailment of train")

| COMPONENT No. j | j-TH COMPONENT |
|---|---|
| 1 | 0.435595 |
| 2 | 0.012305 |
| ⋮ | ⋮ |
| 600 | 0.000806 |

FIG. 6

EXEMPLARY WAYS OF SETTING THE THRESHOLD Tk

|   | Tk | CDOM=1 | CDOM=0 |
|---|---|---|---|
| 1 | A VALUE AS DOB OR DISTANCE | DOS≦Tk | Tk<DOS |
| 2 | DEVIATION OF DOB OR DISTANCE | $\sigma$(DOS)≦Tk<br><br>$\sigma$(DOS): DEVIATION OF DOS | Tk< $\sigma$(DOS) |
| 3 | SAMPLE COUNT COUNTED FROM TOP OF ASCENDINGLY ORDERED LIST | FIRST Tk SAMPLES OF THE LIST | REMAINING PORTION OF THE LIST |
| 4 | A RATIO (%) OF Ck-BELONGING SAMPLES TO THE ENTIRE SAMPLES | FIRST Tk % OF THE LIST | REMAINING PORTION OF THE LIST |

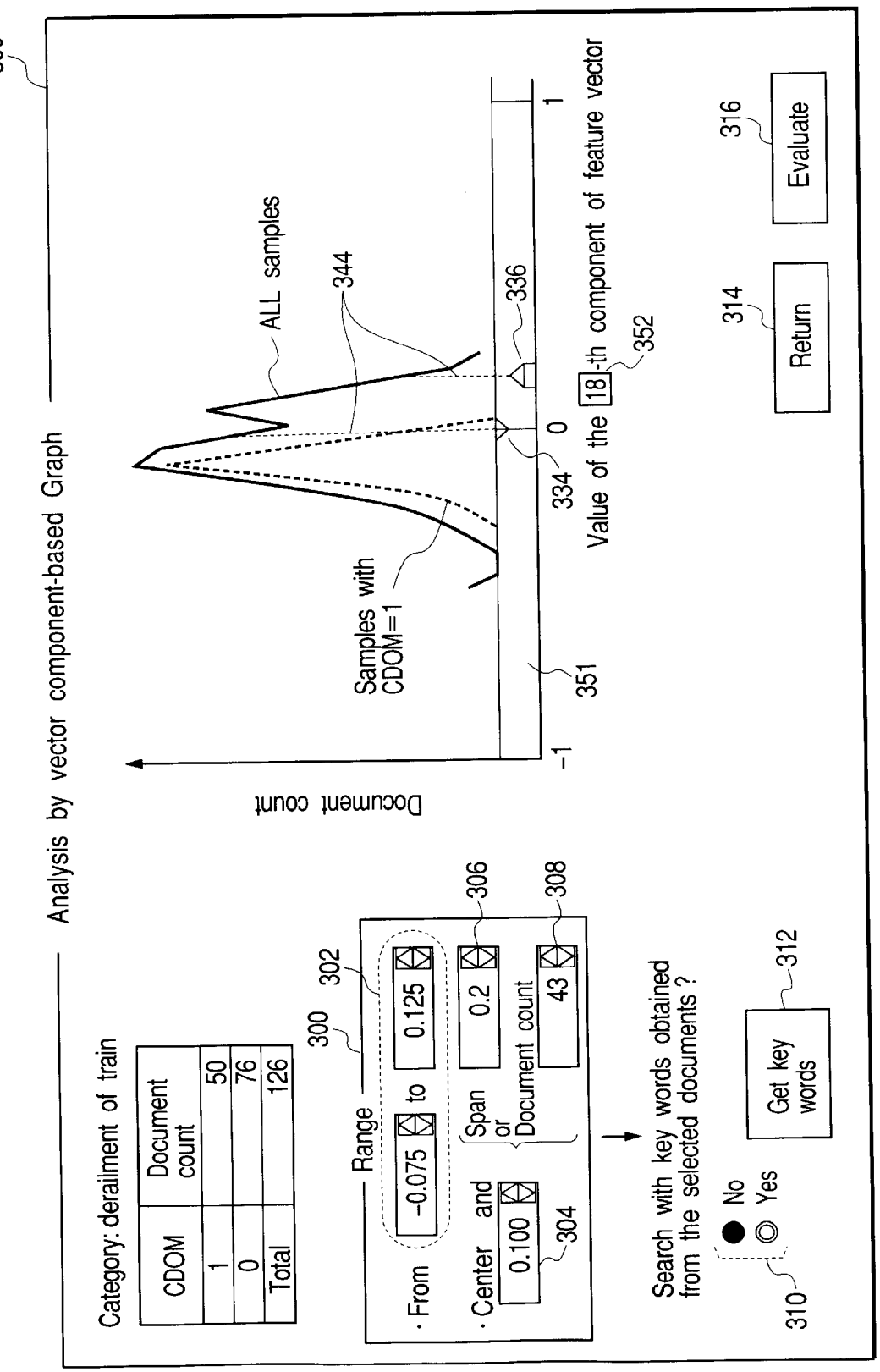

FIG. 10

Category: derailment of train 401

| BDOM | 1 | 2 | Total |
|---|---|---|---|
| Document count | 50 | 76 | 126 |

Selected Range & Documents
From -0.075 to 0.125 /Center: 0.100 ,Span: 0.2
43 documents from
- Nonevaluated subset
- Entire set
- Evaluated subset
- In raw data
- In deviation Exit 403
Return 404
OK 406
402

| Evaluate | Settled CDOM | Calculation Results | | | Headline |
|---|---|---|---|---|---|
| | | CDOM | Document ID | DOS | |
| 1 | 1 | 1 | 85590 | 0.65 | Express train derailed and crashed into a building |
| 0 | 1 | 1 | 9009 | 0.66 | Maintenance car ran off the Keihinntouhoku line |
| 1 | 1 | 1 | 180194 | 0.68 | Gap between train and platform is dangerous |
| | 0 | 1 | 1862 | .071 | Handcar got derailed, two workers had broken bones |
| 1 | 1 | 0 | 84207 | 0.73 | Super express "Sakura" derailment accident |
| | 0 | 1 | 12215 | 0.81 | Derailment of the Nemuro main line |
| 0 | 0 | 0 | 113145 | 0.87 | Two months since Hanshin great earthquake disaster |
| | 0 | 0 | 93675 | 0.96 | Cause of stomachache is tress |
| | 0 | 0 | 100356 | 0.98 | "Movie" forestalling battle |
| | 1 | 1 | 186332 | 1.06 | Chairman W's talk rambled |

411

OK 322

410

Specified document 320
No.

415 416 417 418 419
Blanket setting: ◎None, ◎CDOM, ◎1-evaluation, ◎0-evaluation, ◎clear Specify a document for selection based on the degree of similarity to the specified document. Specify ?: ●No or ◎Yes

EVALUATED CDOM TABLE

"derailment of train" ↓    430

| DOCUMENT No. (1) | IDi | CATEGORY NUMBER k: 1 | 2 | 3 | 234 | ... | K |
|---|---|---|---|---|---|---|---|
| 1 | 47 | 0 | 1 | | | | |
| 2 | 274 | | | 1 | 0 | | |
| 3 | 1862 | | | | 1 | | 0 |
| ... | ... | | | | | | |
| 75 | 9009 | | | 0 | 1 | | |
| 76 | 12215 | 0 | 0 | | 1 | | 0 |
| ... | ... | | | | | | |
| N | 374872 | 1 | | 0 | | | 0 |

FIG. 18A

Left-emphasized distribution function is used.

Total document count=10

| Document ID | DOS | Headline |
|---|---|---|
| 85590 | 0.65 | Express train derailed and crashed in |
| 9009 | 0.66 | Maintenance car ran off the Keihinntou |
| 180194 | 0.68 | Gap between train and platform is dar |
| 1862 | 0.71 | Handcar got derailed, two workers had |
| 84207 | 0.73 | Super express "Sakura" derailment ac |
| 12215 | 0.81 | Derailment of the Nemuro main line |
| 113145 | 0.87 | Two months since Hanshin great earth |
| 93675 | 0.96 | Cause of stomachache is tress |
| 100356 | 0.98 | "Movie" forestalling battle |
| 186332 | 1.06 | Chairman W's talk rambled |

Distribution function is not used.

Top 10 documents in the ascending order list

| Document ID | DOS | Headline |
|---|---|---|
| 32298 | 0.63 | Run off accident of car on JR Toukaido line in A |
| 102508 | 0.64 | Hanshin earthquake disaster, out-of-service tra |
| 189966 | 0.64 | Break failed ? Express train derailed |
| 55293 | 0.64 | Crash derailment accident |
| 98695 | 0.64 | Hyogo Pref. Northern part earthquake in '95 Ha |
| 98750 | 0.64 | Derailment, the engine-man screamed |
| 102454 | 0.65 | Hanshin Railway car ran off in Amagasaki stati |
| 46318 | 0.65 | Maintenance car ran off the Keihinntouhoku lin |
| 85590 | 0.65 | Express train derailed and crashed into a buold |
| 9009 | 0.66 | Maintenance car ran off the Keihinntouhoku lin |

FIG. 24
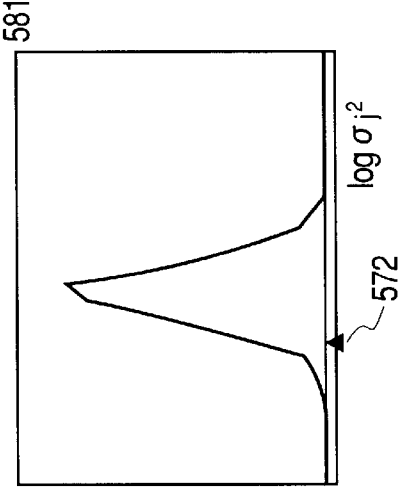
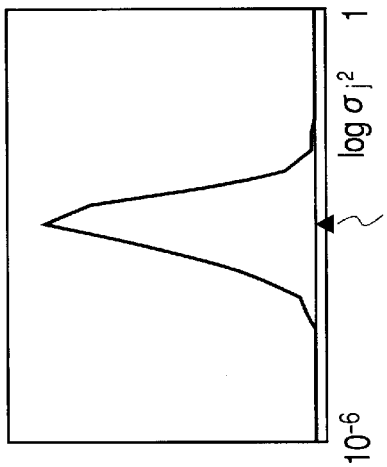

FIG. 26

Category: Ck

| Component No.(j) | Mean for 1-evaluated documents | Variance for 1-evaluated documents | Mean for 0-evaluated documents | Variance for 0-evaluated documents | Weight of equation (13) | Weight of equation (14) | Weight of equation (15) |
|---|---|---|---|---|---|---|---|
| 1 | 0.144824 | 0.001514 | 0.313661 | 0.001071 | 25.70023 | 4.33915 | 2.356864 |
| 2 | 0.00468 | 0.000001 | 0.009262 | 0.000004 | 1000 | 4.582 | 1.527333 |
| 3 | 0.001665 | 0.000425 | 0.006714 | 0.007812 | 48.50713 | 0.244912 | 0.046321 |
| 4 | 0.070108 | 0.000277 | 0.094283 | 0.013031 | 60.08418 | 1.452535 | 0.184829 |

FIG. 28

CATEGORY: Bugs in program

KEY WORDS FOR SEARCH

| Bug | √ |
|---|---|
| Program | |

Check here to use the key word for narrowing the classification results

FIG. 29

| CATEGORY ID | 123 |
| --- | --- |
| CATEGORY CK | Bugs in program |
| ⋮ | ⋮ |
| NARROWING CONDITION | Bug |
| ⋮ | ⋮ |

...

14

TEXT CLASSIFYING PARAMETER GENERATOR AND A TEXT CLASSIFIER USING THE GENERATED PARAMETER

BACKGROUND OF THE INVENTION

1. Field of the Invention

The invention generally relates to a text classifier for classifying a given text into a particular one or more of predetermined categories and, more specifically, to a method and system for generating and training (or optimizing) parameters for used in such a text classifier.

2. Description of the Prior Art

Text data stored in some computer-based systems are increasing in amount and variety day by day. Such stored natural language text data include academic theses, patent documents, news articles, etc. In order for the stored text data to be effectively utilized as information, it is necessary to classify each item of the stored text data into an appropriate category or categories. For this purpose, there have been proposed various types of text classifiers so far.

The present invention relates to a text classification technique, inter alia, of the type that uses a vector space. Vector space-based text classification techniques are disclosed in, for example:

U.S. Pat. No. 5,671,333 issued Sep. 23, 1997 to J. A. Catlett et al., entitled "Training apparatus and methods";

U.S. Pat. No. 6,192,360 issued Feb. 20, 2001 to S. T. Dumais et al., entitled "Methods and apparatus for classifying text and for building a text", which introduces a variety of classification techniques including the theory and operation of Support Vector Machines;

Japanese patent unexamined publication No. 11-053394 (1999), by N. Nomura, entitled "Device and method for document processing and storage medium storing"; and Japanese patent unexamined publication No. 2000-194723 (2000), by K. Mitobe et al., entitled "Similarity display device, storage medium stored with similarity display program, document processor, storage medium stored with document processing program and document processing method".

All of references cited above are incorporated herein by reference.

In vector space-based text classifiers, an M-dimensional vector space is spanned by the basis comprised of a set of vectors $V_1, V_2, \ldots, V_M$ corresponding to M words W1, W2, ..., WM constituting a dictionary. An object or text to be classified is expressed in a point in the vector space. That is, a text or document to be classified is expressed as a feature vector (or document vector) which is a linear combination of the basis $(V_1, V_2, \ldots, V_M)$. Each of the components of a feature vector of a given text is expressed by using the frequency of occurrences, in the given text, of a word associated with the component. Each of the categories in a category set into which an object text is classified is expressed by a reference vector defined for the category. Again, each reference vector is expressed in a linear combination of the basis $(V_1, V_2, \ldots, V_M)$. The degree of closeness of a given text to a class or category is calculated by finding an inner product of the feature vector of the given text and the reference vector for the category, by finding a distance between the two vectors. Whether the given text belongs to the category or not is determined on the basis of the calculated degree of closeness.

The dimension of the feature vectors may be reduced by applying a lower rank approximation through the singular value decomposition to a document-word matrix obtained by arranging the feature vectors of the documents in a set of documents to be classified. Each component of such a dimension-reduced feature vector for an object document reflects not the frequency of a word itself but the extent to which the object document relates to a set of (weighted) words. In this case, mathematical operations such as distance calculations, inner product calculations and so on are possible in the same manner as in case of the original vector space.

A vector space-based classifier varies the result or the decision on whether a document belongs to a particular category depending on the reference vectors associated with respective categories and the magnitude (or threshold) of the degree of closeness within which magnitude the document is classified into the particular category. The components of the reference vectors and the threshold values of the degrees of closeness for all the categories of a set of categories are called "classification parameters". In order to achieve accurate classification, the classification parameters have to be properly determined or optimized.

In conventional parameter training, samples (i.e., documents selected for training) are classified by using a classifier with roughly determined initial classification parameters. Reviewing the classification result, classification parameters are modified. This trial-and-error process is iterated until satisfactory classification is reached. The modification of classification parameters is achieved either by an operator directly modifying the parameters him/herself or by an operator correcting the classification results and the classifier recalculating the parameters through machine learning based on the operator's corrections.

However, in directly modifying schemes, it is difficult for the operator to know which of a large number of parameters to modify and how to modify one or more parameters selected for modification. Also, in classification result correcting schemes, it is difficult for the operator to know which of a large number of classification results to correct. These difficulties make the classification parameter modification a time taking task, which does not necessarily yield desirable classification parameters.

The present invention has been made to overcome the above and other problems in the art.

What is needed is a classification parameter generating method and system for enabling the operator to train the classification parameters interactively and effectively through various data analysis and selection tools.

What is needed is a classification parameter generating method and system that can be used for the case where each of reference vectors for the categories is considered to point statistically distributed points instead of a fixed point.

What is needed is a classification parameter generating method and system capable of calculating hitting rates for the samples having been reviewed. The hitting rate is the rate of the number of documents whose CDOM and evaluated CDOM equal each other for the category Cr to the number of documents whose CDOM for the category Cr has been evaluated.

What is needed is a classification parameter generating method and system with sample set generating and expanding capabilities. What is needed is a text classifier that uses a plurality of sets of classification parameters.

What is needed is a text classifier for determining whether a given text belongs to a specified category.

SUMMARY OF THE INVENTION

According to the principles of the invention, a method of and system for generating a set of parameters for user in determining whether a given document belongs to a specified one of a plurality of predetermined categories is provided. The system comprises a set of documents, each document having an identifier (ID); a document data set containing a record for each document which record contains a document ID of the document and a feature vector representing features of the document in a predefined vector space; and a category data set containing a record for each category which record contains a category ID of the category, a category name and the set of parameters. The parameters include a reference vector representing features of the category in the predefined vector space and a threshold value determined for the category. In this system, a membership score indicative of whether the document belongs to the specified category is calculated for each document by using the feature vector of the document, the reference vector of the specified category and a threshold value of the specified category. An evaluation sample selection screen enables an operator to interactively enter various command parameters for selecting documents for which the calculated membership scores are to be evaluated. In response to an input of one of the command parameters, information useful for the selection of documents is visually presented to the operator. An evaluation value input screen shows selected documents and permits the operator to enter an evaluation value to each of the displayed selected documents. And, the entered evaluation values are reflected to the reference vector of the specified category.

The command parameters include a specification of one of selection criterions and the range of the selection criterion.

The evaluation sample can be selected by weighing the document distribution with a desired one of predetermined probability distribution functions.

A further sample selection is possible based on the selected evaluation samples. Further selection may be on the basis of the degree of similarity to a user-specified sample. A further selection may be implemented by extracting key words from the selected evaluation samples and making a search with the key words.

The evaluation sample selection is achieved by a comparison between the previous and current calculation results.

The quality of parameters is checked by the hitting rate in the calculated degree of membership (CDOM).

An inventive parameter training system is further provided with the features: the weighting based on variance analysis of the vector components; and the expansion of document set and/or category set.

In one embodiment, a different set of documents of a suitable number (say, the same number as the sample set 11) is selected from the actual document set to use for training at each cycle of training. In this case, each of the reference vectors is given as a distribution function. The degree of similarity is given as the probability that the document belongs to an area, within the distribution range of the reference vector for the category, defined by a preset threshold.

A text classifier which uses a set of parameters generated according to the present invention is also disclosed.

BRIEF DESCRIPTION OF THE DRAWING

Further objects and advantages of the present invention will be apparent from the following description of the preferred embodiments of the invention as illustrated in the accompanying drawing, in which:

FIG. 4 shows an example of a feature vector $D_{1934}$ for a sample document i=1934;

FIG. 5 shows an example of a reference vector C234 for a category C234 named "derailment of train";

FIG. 6 is a table showing exemplary ways of setting a threshold Tk for finding the degree of membership from the degree of similarity;

FIG. 9 is a diagram showing another example of an evaluation sample selection screen displaying a vector component-based graph;

FIG. 10 is a diagram showing an exemplary calculation result evaluation screen;

FIG. 12 is a diagram showing an exemplary structure of an evaluated CDOM table;

FIGS. 18A and 18B are diagrams showing the difference between calculation result evaluation displays provided when evaluation target is selected by using a left-emphasized distribution function and by not using any distribution function, respectively;

FIG. 24 is a diagram showing an example of a variance calculation result display screen 570

FIG. 26 is a diagram showing an exemplary data table displayed by the variance analysis/weighting subsystem 590;

FIG. 28 is a diagram showing an example of a search condition entry screen;

FIG. 29 is a diagram showing an exemplary manner of a narrowing condition being stored in the category data/classification parameter table 14;

Throughout the drawing, the same elements when shown in more than one figure are designated by the same reference numerals.

DETAILED DESCRIPTION OF THE PREFERRED EMBODIMENTS

1. Embodiment I: With a Fixed Set of Samples

Figure 1:
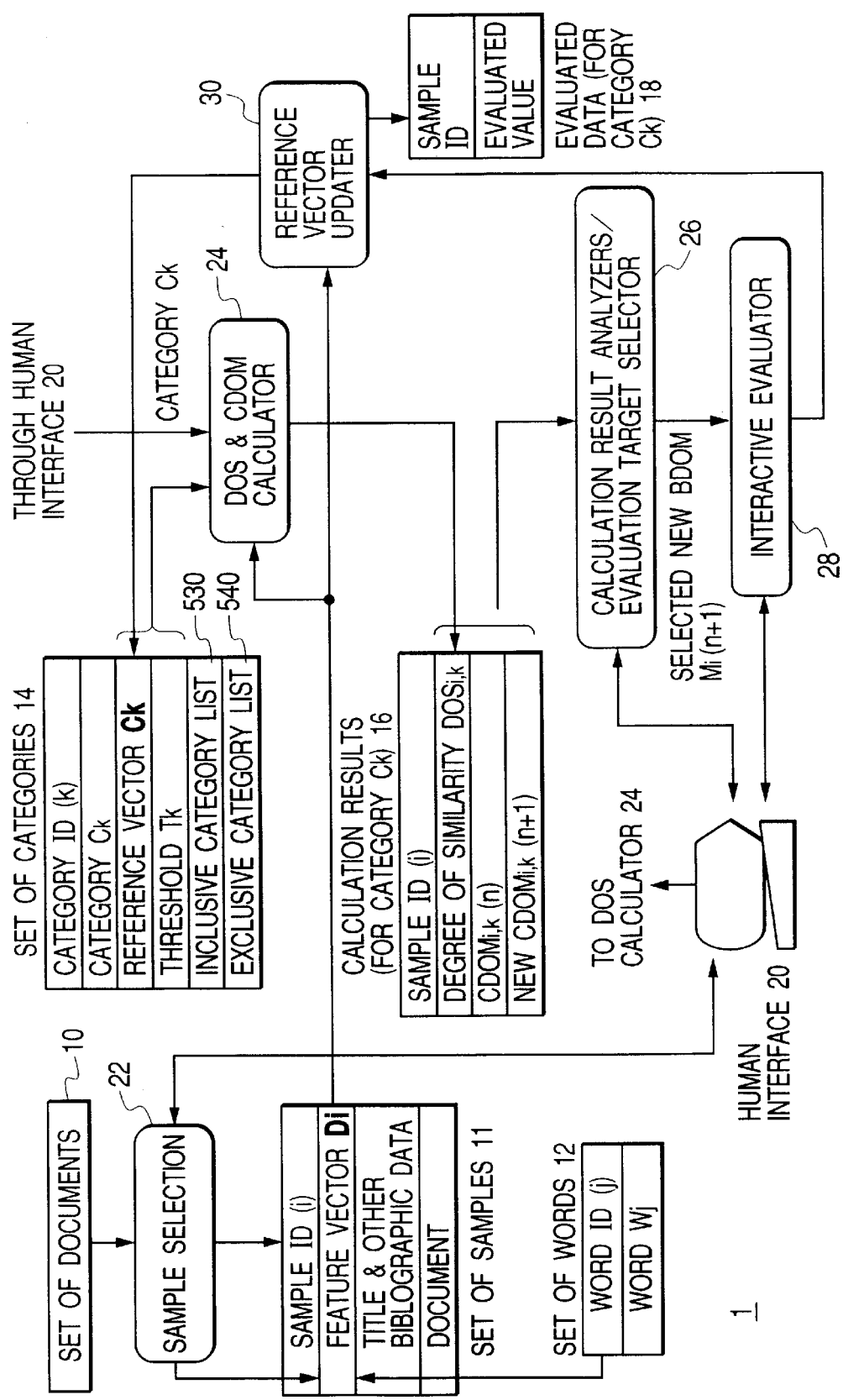
FIG. 1 is a schematic block diagram showing an arrangement of a classification parameter generating system of the invention.

FIG. 1 is a schematic block diagram showing an exemplary arrangement and operational principles of a classification parameter generating system 1 in accordance with a first illustrative embodiment of the invention. It is noted that since a classification parameter generating system generally includes a text or document classifier, a classification parameter generator or training system can be said to be a text or document classifier with a classification parameter generator or training subsystem. In this sense, it can be said that FIG. 1 shows a text classifier with a classification parameter generator.

In FIG. 1, each of rectangles indicates a piece or a set of data and each of corner-rounded rectangles indicates a process or program. Arrows with a line-drawn head indicate data flows, and arrows with a triangular head filled with black indicate the generation of data pointed by respective arrows.

1.1. Preparing Necessary Data

In FIG. 1, the system 1 needs a set 11 of sample documents (or samples) for use in generating classification parameters for use in a text classifier. If a set 10 of documents to be practically classified is sufficiently small in size to be used for training the classification parameters, the document set can be used, as it is, as the set 11 of samples. Otherwise, an appropriate number (N) of sample documents 11 to be used for parameter training are selected 22 from the actual set 10 of document. The sample selection 22 is detailed later.

Prior to classification parameter generation, the operator or user of the system 1 has to prepare a dictionary 12 containing a set of words which are to be used in the actual document set 10 and a category data/classification parameter file 14 for each category in addition to the sample document set 11.

Though in FIG. 1, there are shown various data sets, files or tables such as 11, 12, 14, 16, 18, etc. where data names are listed, it should be noted that such data sets, files and tables may contain any suitable data other than those explicitly shown. Also, each of such data sets, files and tables is not necessarily a single set, file or table and may be implemented as separate sets, files or tables associated with each other.

The dictionary 12 contains M records for words {Wj: j=1, 2, ..., M}, where M is the number of words and j is the word ID or number of each word.

For each of N sample documents 11, a sample ID or number i (in this specific example), the title and other bibliographic data of the document, and the document itself are stored such that the sample ID is associated with each of the other data: i.e., they are stored in a file or in a record of a table or file if the size of documents 11 are relatively small. Further, the operator has to generate a feature vector Di for each sample. As described above, it is assumed that each document is expressed as a point in an M-dimensional vector space spanned by the basis comprised of a set of vectors $V_1, V_2, \ldots, V_M$ corresponding to the M words W1, W2, ..., WM. In this specific embodiment, the feature vector Di characterizing a sample document i is expressed in the form of a linear combination of the basis ($V_1, V_2, \ldots, V_M$) as:

$$Di = \sum_{j=1}^{M} a_{i,j} V_j, \quad (1)$$

where a coefficient $a_{i,j}$ is a j-th component of the feature vector Di and, in other words, a normal expression of the frequency $f_{i,j}$ of occurrences of word Wj in the i-th document. That is, the j-th component $a_{i,j}$ is expressed as:

$$a_{i,j} = \frac{f_{i,j}}{\sqrt{f_{i,1}^2 + f_{i,2}^2 + \ldots + f_{i,M}^2}} \quad (2)$$

Thus calculated feature vectors D1, D2, ..., DN for the sample documents are stored in association with respective sample Ids. It is noted that though, for each sample i, the sample ID, the feature vector Di, the title & other bibliographic data and the document itself are shown as stored in a set in FIG. 1, there is no need to do so. These data may be stored separately as long as the data other than sample ID are associated with the sample ID. This is also true to the data of the category data file 14.

FIG. 4 shows an example of a feature vector $D_{11934}$ for a sample document Di=11934, which is an article headlined "Trains derailed in the Nemuro main line and the Sannriku railway". In this specific example, the dimension of vector space (i.e., the number (M) of words contained in the dictionary 12) is assumed to be 600. This vector $D_{11934}$ is expressed as a 600-component array (0.159713, 0.004751, . . . , 0.015522) for example.

Again in FIG. 1, the operator also has to prepare a set of categories into which the documents of the actual document set 10 and the sample document set 11 are classified, and generate the category data file 14 that contains various data concerning the categories. In the preparation stage, each of the records of the category data file 14 contains category identifier or number k, and a category Ck identified by the category number k.

In addition to the above mentioned sample selection tool 22, the classification parameter generating system 1 comprises a human interface 20, which usually includes a display, a keyboard, a mouse, etc.; a DOS & CDOM calculator 24 for calculating a degree of similarity (DOS) which indicates how far a sample document is similar to a given category and a calculated degree of membership (CDOM) which indicates the extent to which the sample document belongs to the given category; a calculation result analyzers/evaluation target selector 26 for enabling the operator to interactively select samples to be evaluated; an interactive evaluator 28 for enabling the operator to evaluate the exactness of CDOM of the selected samples; and a parameter updater 30 for updating the reference vectors that have been used for the DOS calculation in the previous training cycle.

These components can be realized as software or programs executed on any suitable hardware such as various computers, computer-based systems that include a CPU (central processing unit), etc. For this reason, we have omitted the description and drawings of such hardware, computers, computer-based systems, a CPU, etc. From this point of view, the present invention is implemented in any of the forms of an apparatus including specific hardware, a program or program package stored in storage media and a data set distributable via transmission media. In any case, the operations described in the following are executed by one or more CPU included in hardware. For this reason, though no CPU is shown, an expression "the CPU" is used in the following description.

Once the above-described data are obtained in thus configured system 1, we can proceed to generation of parameters.

1.2. Operation Principles

Figure 2:
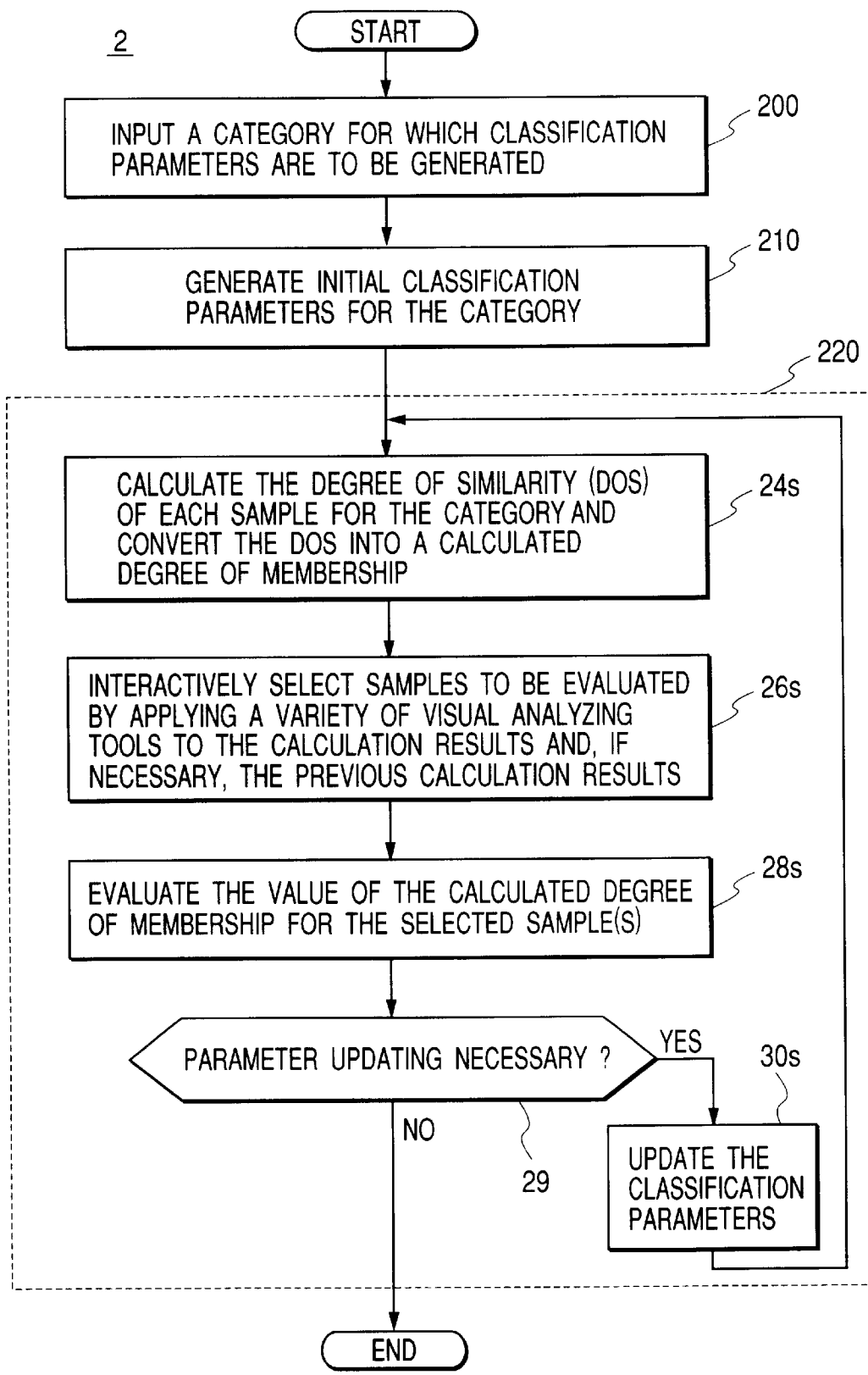
FIG. 2 is a flowchart showing the principle of operation of the classification parameter generating system 1 FIG. 1.

FIG. 2 is a flowchart showing the principles of operation executed by not-shown CPU of the classification parameter generating system 1. In FIG. 2, the operator inputs a category for which classification parameters are to be generated in step 200. In this specific example, it is assumed that the operator inputs a category Ck="derailment of train".

In step 210, initial classification parameters for the input category Ck are generated. In this embodiment, classification parameters for category Ck are a reference vector Ck that is used for the calculation of the degree of similarity of a given document to the category Ck and a DOM-determinant threshold that is used together with the calculated degree of similarity for the judgment on whether the given document belongs to the category Ck. Basically, the reference vector Ck is obtained by finding a mean vector each component of which is the mean of corresponding components of feature vectors belonging to the category Ck and normalizing the mean vector such that the length of the mean vector equals 1 as detailed later. FIG. 5 shows an example of a reference vector C234 that has been calculated for a category C234 (e.g., "derailment of train"). It is noted that, instead of using mean vectors for the reference vectors, any suitable quantity used in vector space-based techniques may be used including the inner product between each feature vector and a reference vector.

Since an initial reference vector Ck is increasingly improved in accuracy through iterated training, the initial reference parameter Ck has not to be accurate. Accordingly, as the initial reference vector Ck, there may be used a feature vector for a certain sample that the operator judges to be a member of the category Ck, a mean vector of a part or the entirety of the sample document set 11, etc.

Since the system 1 uses, as the classification output, the calculated degree of membership, in which a CDOM of 1 indicates the membership and a CDOM of 0 indicates the nonmembership, a single threshold is used for the calculation of the DOM. However, the DOM or the extent to which a given sample belongs to a particular category may be expressed in any desired levels more than two. In this case, L-1 DOM thresholds are used to define L-1 steps lying between L levels.

The initial reference vector Ck and the initial DOM-determinant threshold Tk that have been determined as described above are stored in the category data file 14 for category Ck for example as shown in FIG. 1.

Figure 3:
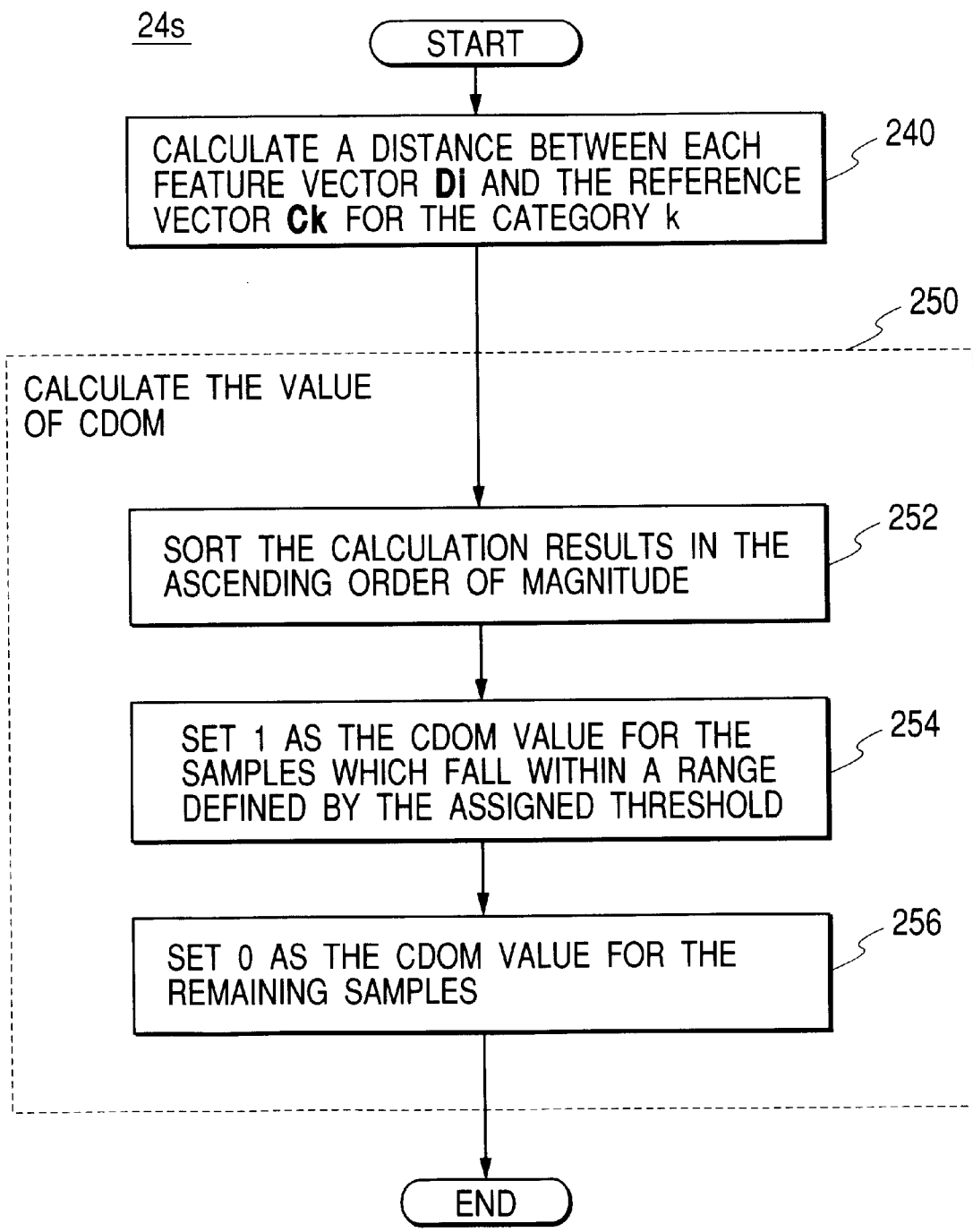
FIG. 3 is a flowchart showing an operation executed in step 24s (FIG. 2) under the control of DOS & CDOM calculator 24 (FIG. 1)

Again in FIG. 2, the parameter training is carried out in training step 220. The DOS & CDOM calculator 24 calculates the DOS of each sample i for the category Ck (hereafter, referred to as "quantity $DOS_{i,k}$") and determines the DOM value by comparing the calculated DOS with the threshold Tk for the category Ck in step 24s. This process is shown in detail in FIG. 3. In the figure, the calculator 24 calculates, as the DOS, a distance between each feature vector Di and the reference vector Ck for the category Ck in step 240. In this specific example, a DOS is defined by, for example, the well-known simple Euclidean distance between the vectors Di and Ck, which is denoted as $d_{i,k}$ or $DOS_{i,k}$ in this specific example. That is, $$DOS_{i,k} = d_{i,k} = \sqrt{\sum_{j=1}^{M}(a_{i,j} - c_{k,j})^2}, \quad (3)$$

where $c_{k,j}$ is a j-th component of the reference vector Ck=$(c_{k,1}, c_{k,2}, \ldots, c_{k,M})$. Since the reference vector Ck is a normalized version of a mean vector each component of which is the mean of corresponding components of feature vectors $\{Db|b \in B\}$ for sample documents belonging to the category Ck as described above, the j-th component $c_{k,j}$ is expressed as:

$$c_{k,j} = \mu_{k,j} / \sqrt{\sum_{j=1}^{M} \mu_{k,j}^2}, \quad (4)$$

where B is a set of sample document IDs for the belonging samples, and $\mu_{k,j}$ is a j-th component of the above-mentioned mean vector and defined as:

$$\mu_{k,j} = \sum_{b \in B} a_{b,j}. \qquad (5)$$

By using equation (3), the distance $d_{1934, 234}$ of sample document 11934 (FIG. 4) to category C234 (="derailment of train") (FIG. 5) is calculated as:

$$d_{1934, 234} = \{(0.159713 - 0.435595)^2 + (0.004751 - 0.012305)^2 + \ldots + (0.015522 - 0.000806)^2\}^{1/2} =$$
0.9 for example. (6)

It is noted that this embodiment uses the Euclidean distance for the DOS, any suitable one of distances proposed so far (e.g., the Mahalanobis distance) may be used.

Then, the calculator 24 calculates the value of the DOM (referred to as the "calculated DOM" or "CDOM") by approximating the calculated DOS with a closest one of L levels defined by the above-described L-1 threshold(s) in step 250. In this specific example, the DOS is preferably binarized by using a single threshold to obtain a calculated degree of membership (CDOM) as described above. Specifically, the calculator 24 sorts the calculation results in the ascending order of the magnitude of DOS in step 252; sets 1 to the CDOM values of the samples which fall within a range defined by the assigned threshold Tk in step 254; and set 0 to the CDOM values of the remaining samples in step 256, which completes DOM-calculation step 250 (i.e., step 24s of FIG. 2).

FIG. 6 shows exemplary ways of setting the DOM threshold Tk. As shown in the table of FIG. 6, (1) The threshold Tk may be a possible value of the DOS (e.g., the distance between each feature vector Di and a relevant reference vector Ck). In this case, samples with a DOS equal to or smaller than the threshold Tk are set 1; and samples with a DOS larger than the threshold Tk are set 0.

(2) If the threshold Tk is the standard deviation σ (DOS) of the DOS, then samples for which the standard deviation σ (DOS) is equal to or smaller than the threshold Tk are set 1; and samples for which the standard deviation σ (DOS) is larger than the threshold Tk are set 0.

(3) If the threshold Tk is the number of samples counted from the first sample in a list of samples ordered in the ascending order of the magnitude of DOS, then the first Tk samples of the list are set 1; and the remaining or following samples are set 0.

(4) The threshold Tk may be set to the ratio of samples that belong to a relevant category Ck to the entire samples. In this case, the first samples (in a list of samples ordered in the ascending order of the magnitude of DOS) of a number corresponding to the ratio Tk with respect to the entire samples are to be set 1; and the remaining or following samples are to be set 0. If the ratio is set in the percentage, then the first Tk % of the list is set 1. However, the operator has no idea of the belonging ratio or the number of belonging samples (or even whether each sample belongs to a category Ck). For this reason, the operator may estimate the belonging ratio for an initial threshold Tk value as he or she thinks fit, and subsequently update the value of the threshold Tk by correcting the belonging ratio as the training process advances.

If the threshold Tk is set to 0.8 in above-described Tk setting scheme (1), then since the distance of sample 11934 to category C234 (="derailment of train"), i.e., $d_{11934, 234}$ is 0.9 from calculation (6), the calculator 24 judges the value of $CDOM_{11934, 234}$ to be 0 because the threshold Tk is smaller than $DOS_{11934, 234}$. Also, if the threshold Tk is set to 40% in above Tk setting scheme (4) and if the (40N/100)-th sample in the ascendingly ordered sample list has a DOS value of 0.91 in a classification for category C234, then this means that sample 11934 appears earlier than the (40N/100)-th sample in the ascendingly ordered sample list, which causes the calculator 24 to judge the $CDOM_{11934, 234}$ to be 1.

The DOS & CDOM calculator 24 stores the calculation results: i.e., a sample ID (Di) or a sample number i, $DOS_{i,k}$, and $CDOM_{i,k}$ in a calculation result file 16 for category Ck as shown in FIG. 1 It should be noted that each record of the calculation result file 16 preferably has two fields for storing 2 $CDOM_{i,k}$ values: i.e., a value $CDOM_{i,k}(n)$ calculated in the previous training cycle (constituted by processes by elements 24 through 30 in FIG. 1 or by steps 24s through 28s, 29 and 30s in FIG. 2) and a value $CDOM_{i,k}(n+1)$ just calculated in the current cycle. Accordingly, the calculator 24 preferably stores the just calculated $DOM_{i,k}(n+1)$ so as to cause the previous $CDOM_{i,k}(n)$ to remain and to be differentiated from the new $CDOM_{i,k}(n+1)$.

Completing step 250 or 24s, the classification parameter generating system 1 enables the operator to interactively select evaluation target samples the calculation results of which are to be evaluated by applying a variety of visual analyzing tools to the calculation results and, if necessary, the previous calculation results in step 26s. For this purpose, the operator can invoke an evaluation target selection condition-designating screen to interactively select appropriate samples to be evaluated as shown in FIG. 7.

Figure 7:
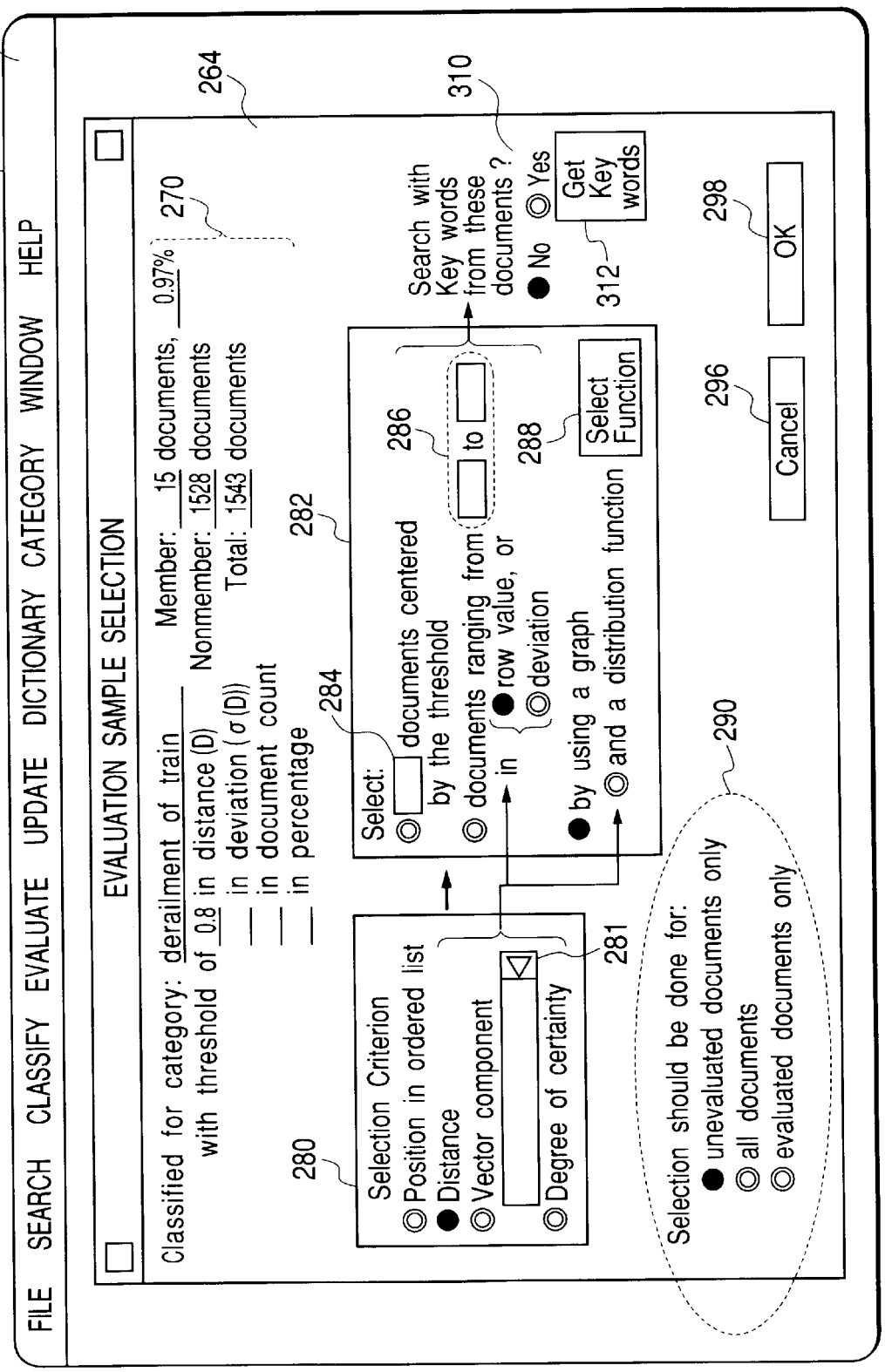
FIG. 7 is a diagram showing an example of an evaluation target selection condition-designating screen in accordance with the invention.

In FIG. 7, the evaluation target selection condition designating screen 260 has a menu bar 262 on the top thereof, which is common to all the screens in this system 1, and has an evaluation sample selection dialog box 264 displayed in the remaining portion thereof. (Though the menu bar 262 is always displayed, it is omitted in the subsequent drawings.) Actually, selecting a sample selection command (not shown) in an Evaluate menu of the menu bar 262 causes the evaluation target selector 26 to display the evaluation sample selection dialog box 264. In the upper column 270 of the dialog box 264, there is displayed some pieces of information on just executed DOS and CDOM calculation 24s, which includes the category Ck for which the calculation 24s has been made, the type and the value of the classification threshold Tk, the number and the percentage of the member documents of the category Ck, the number of nonmember documents and the total document number for example.

The evaluation target selector 26 also provides a selection criterion specifying function 280, which first enables the operator to select one of the selection criterions such as:

(1) the position in the list of documents arranged in the ascending order,
(2) the DOS or distance,
(3) the value of a vector component selectable by a radio button 281, and
(4) the degree of certainty, which is available in such a system in which the reference vectors are randomly varies at each training cycle (such the system will be detailed later).

In the example of FIG. 6, the distance is selected in the selection criterion specifying box 280.

Regardless of which of (1) the in-list position, (2) the distance, (3) the vector component and (4) the degree of certainty the operator selects for the selection criterion, the operator can set a selection range with respective to the selected selection criterion in one of three ways in a selection range specifying box 282. Specifically, the operator can select documents:

(a) centered by the DOM threshold used in the previous cycle or nitration of train by specifying the total number 284 to be selected and/or by the number (not shown) to be selected from each of the upstream portion and the downstream portion of the ascending ordered sample list, (b) in a range specified by numeral input columns 286, or (c) by using one of a plurality of graphs automatically selected according to the selection criterion specified with the selection criterion specifying function 280.

Evaluating the calculation results based on the selection strategy of (a) selecting documents in the neighborhood of the DOM threshold Tk is useful for not only the training of the reference vector Ck but also the training of the DOM-determinant threshold Tk. It is especially true in a stage where the reference vector Ck has been trained to such an extent as yields sufficiently satisfactory accuracy for samples whose DOSs are not so close to the DOM-determinant threshold Tk.

In case of the range specification (b), the documents that fall within a range of a specified selection criterion are selected for the evaluation of the calculation results. In the range specification (b), if the selection criterion is other than the in-list position (1), the range may be specified either in row values of the physical quantity specified in the box 280 or in respective standard deviations of the row values by using respective radio buttons. In this case, it is preferable to set the button for the row values selected in an initial process in preparation for default of input by the operator.

Figure 13:
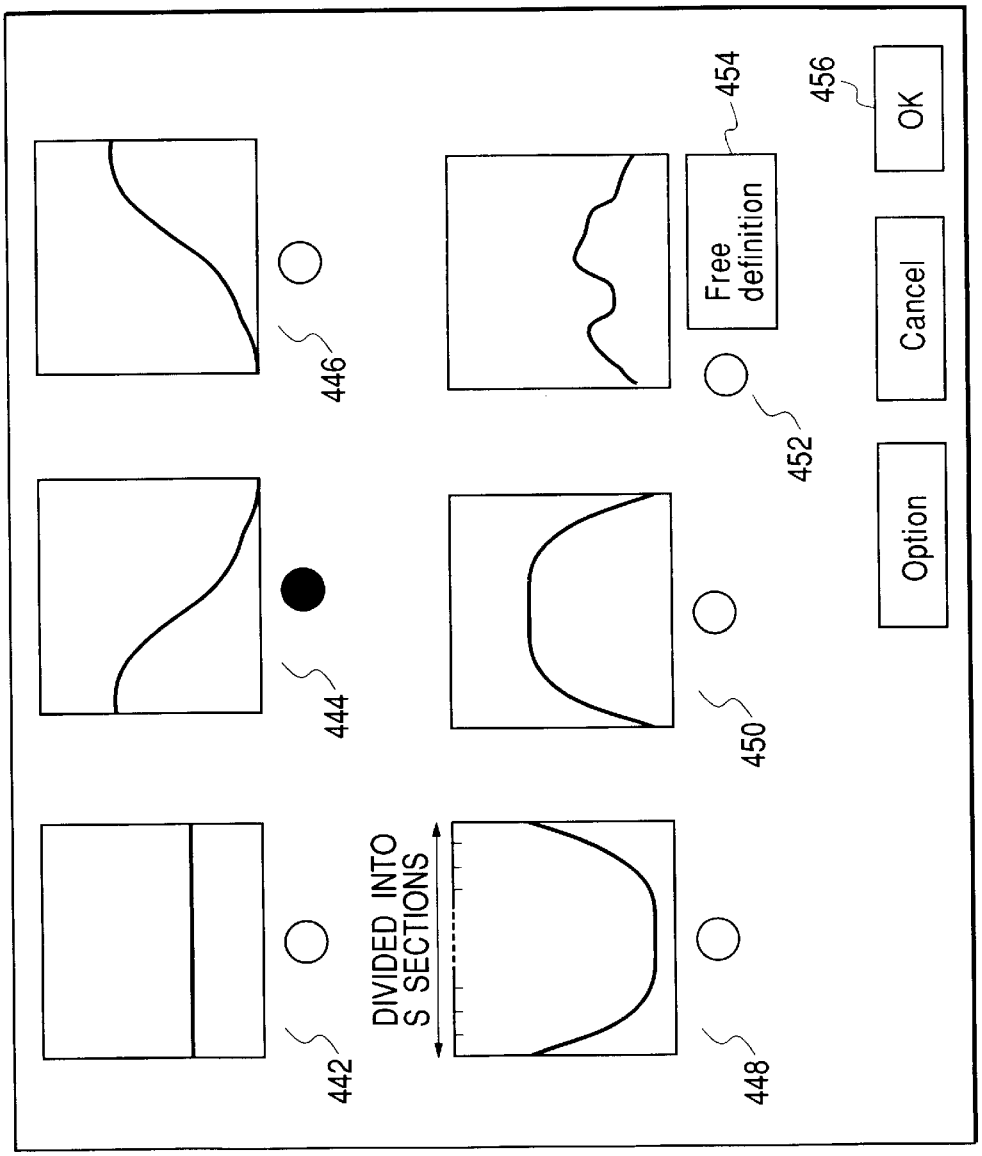
FIG. 13 is a diagram showing an exemplary probability distribution function selection screen.

In case of graph-based selection (c), if the selection criterion is other than the in-list position (1), then the user can carry out a sample selection using one of various distribution functions as shown in FIG. 13 by clicking a predetermined button, say, "Select Function" button 288 in box 282. The sample selection using a distribution function will be detailed later.

Also, evaluation sample selection dialog box 264 includes a set 290 of three radio buttons, which enables the operator to determine which of unevaluated documents only, all documents or evaluated documents only the subsequent sample selection should be done for. The evaluation sample selection dialog box 264 further includes a cancel button 296 to exit therefrom or discontinuing the sample selection step 26s, and an OK button 298 to execute a process specified so far in the dialog box 264.

Figure 8:
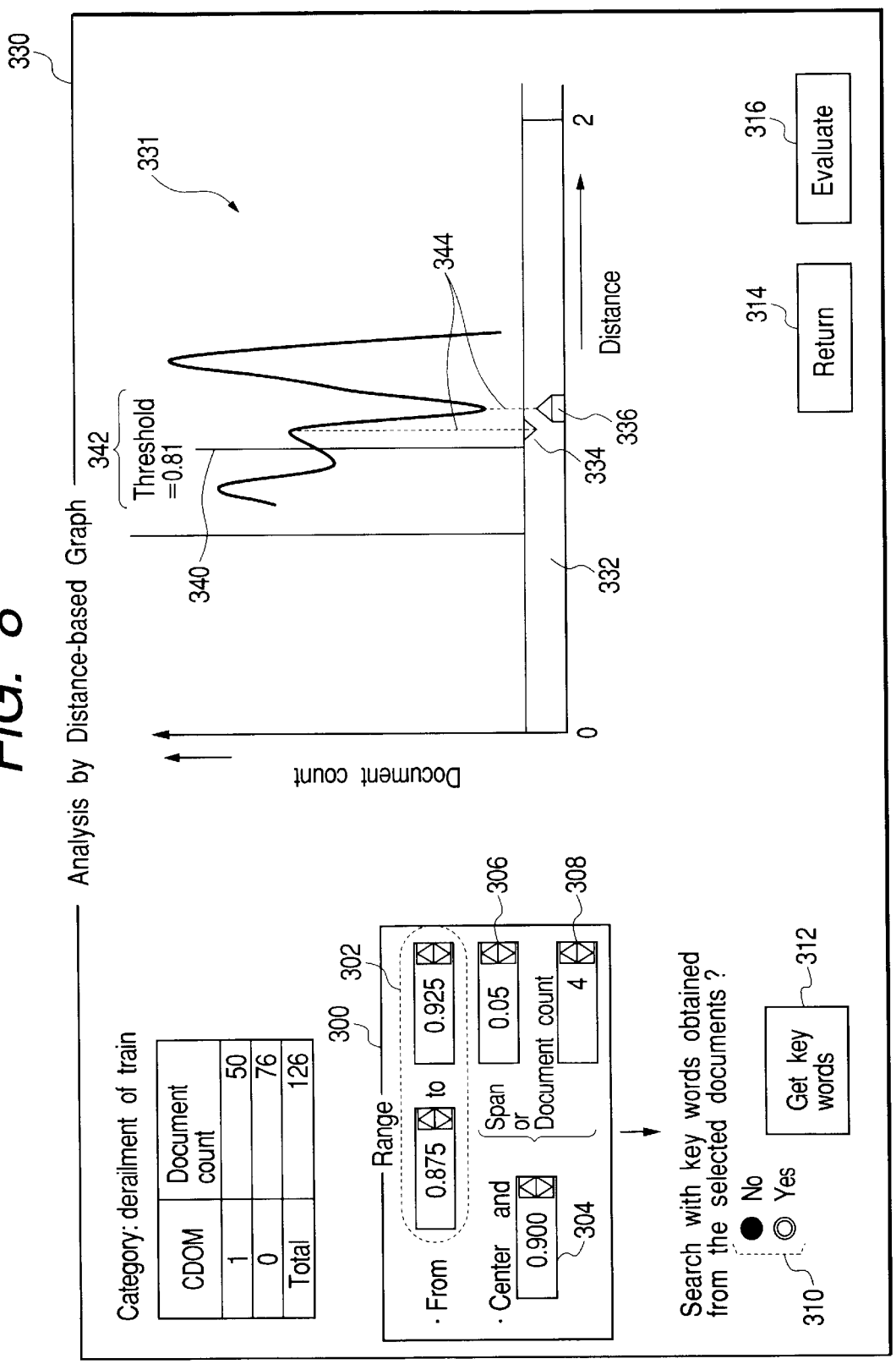
FIG. 8 is a diagram showing an example of an evaluation sample selection screen displaying a distance-based graph.

For example, if the operator selects the distance (or DOS) in box 280 and "by using a graph" in box 282 and clicks the OK button 298, then the evaluation target selector 26 displays a graph-based selection screen 330 that includes a graph 331 as shown in FIG. 8. In FIG. 8, the horizontal axis of the graph 331 is a graduated slide switch 332 that indicates the DOS (the distance in this specific example) and has a pair of slidable cursors 334 and 336 for specifying a range from which evaluation target samples are selected. The vertical axis of the graph 331 indicates the number (or the document count) of documents the DOS of which is equal to a value on the horizontal axis 332.

In distance-based graph 331, the position of the DOM threshold Tk used in the previous training cycle is shown by a vertical line 340 and a literal indication 342 including the value of threshold Tk. The range defined by the cursor positions is also displayed by an appropriate emphasizing technique by using special vertical lines, a color, a texture pattern or any combination thereof. The positions of the slide cursors 334 and 446 not only are indicated but also can be entered in two ways in a selection range display and entry box 300. Specifically, the range of sample selection is indicated both in cursor position indicator/entry fields 302 and in range center indicator/entry field 304, range span (or width) indicator/entry field 306, and document count indicator/entry field 308 in which the number of documents that falls within the range between two cursors 334 and 336 is displayed and entered. It is preferable to interlock the values in the fields 302 through 308 in the selection range box 300 and the cursor 334 and 336 positions. This enables the operator to specify the evaluation sample selection range either by operating any two of cursors 334 and 336 and cursor position indicator/entry fields 302 or by entering a desired value in range center indicator/entry field 304 and entering a value in either range span field 306 or document count field 308. In this way, the evaluation target selector 26 provides a high degree of freedom in the evaluation target sample selection.

If the standard deviation is selected as the quantity for expressing the range of sample selection in the range specifying box 282 of FIG. 7, then the horizontal axis 332 indicates the standard deviation of the DOS or distance in graph 331 of FIG. 8

FIG. 9 is a diagram showing another example of an evaluation sample selection screen 350 in which a vector component-based graph is displayed. The screen 350 is displayed when the operator selects the vector component as the selection criterion and enters the ID or number of a desired vector component in the selection criterion box 280; clicks the button "by using a graph"; and further clicks the OK button 298 in the evaluation sample selector 264 of FIG. 7. FIG. 9 is basically identical to FIG. 8 except that the horizontal axis 332 has been changed to the horizontal axis 351 to indicate the value of a vector component. The evaluation target selector 26 is preferably so configured as to permit the operator to change the ID or number of the vector component as the selection criterion through a component number indicator/entry field 352.

Graph-based evaluation sample selection screens such as shown in FIGS. 8 and 9 have a Return button 314 for return to the evaluation sample selection dialog box 264 for further analysis or a retrying the analysis. Though it is of course possible to invoke the dialog box 264 through the evaluate menu of the menu bar 262, returning to the dialog box 264 through the Return button 314 enables a process that uses the selected samples.

If an Evaluate button 316 is clicked in a graph-based evaluation sample selection screen, then the not-shown system CPU ends the process of evaluation target selector 26 (i.e., the sample selection step 26s) and starts processing the Interactive Evaluator 28. The evaluator 28 first displays an evaluation screen shown in FIG. 10, while the operator starts evaluation step 28s in FIG. 2.

In FIG. 10, the evaluation input screen 400 displays, in the upper portion thereof, the category; document counts for documents with CDOM of 1, documents with CDOM of 0 and the entire documents; and a box 402 including information on the sample selection range, the number of documents selected for evaluation and which of the entire sample set, the subset of nonevaluated samples and the subset of evaluated samples the selection was applied to. Evaluation data display table 410 a record for each of the selected samples. A record of each sample includes the document ID and the headline of the sample, the system-calculated DOS and CDOM, settled CDOM 412 which is an evaluation value that has been manually input at the time of past evaluation, and an evaluation value entry column 414.

Though it is seen from column 402 that 43 samples has been selected, only ten records are shown in FIG. 10. The remaining records can be displayed by operating the slide switch 411. If the user desires to examine the details of a sample in order to evaluate the sample properly, he/she can get detailed information by clicking the headline of a desired sample.

Figure 11:
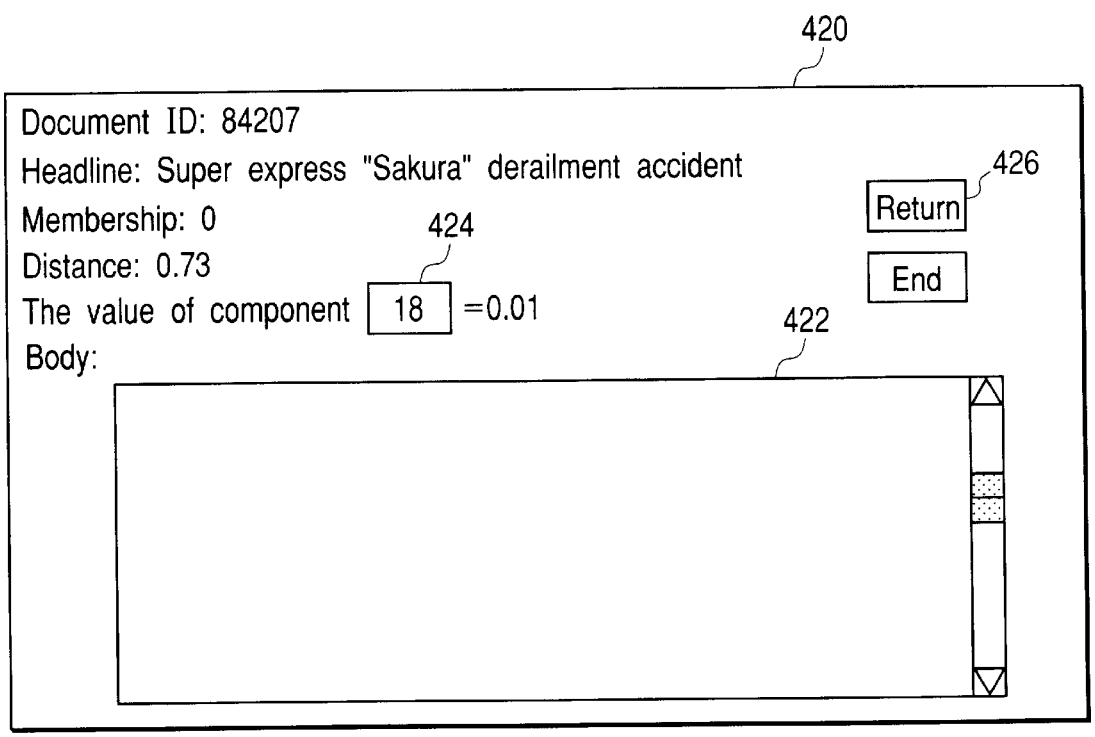
FIG. 11 is a diagram showing an exemplary document information-displaying screen.

FIG. 11 shows an example of a screen for providing detailed information on a document. In FIG. 11, the document information screen 420 includes a window 422 for displaying the body of the specified document. The screen 420 preferably includes a vector component number entry field 424 so as to display the value of the specified vector component. If an Exit button 426 is clicked, then the evaluation screen 400 is displayed. Alternatively, the document information contained in the screen 420 may be displayed in a newly created window over the evaluation input screen 400.

Referring back to FIG. 10, a vacancy in the settled CDOM field 412 means that the sample has not yet been evaluated, by an operator, for at least the specific category indicated in the category display portion 401. It should be noted that the term "evaluate" means that a human operator assigns an evaluation value 1 or 0 to a Since the settled or evaluated CDOMs or membership values are considered to be accurate, the values in the settled CDOM fields 412 have been preferably set in the evaluate field 414 when the evaluation screen 400 is displayed. By doing this, the operator has only to evaluate the samples which evaluate field 414 is vacant.

Further, the system provides a blanket setting function that automatically fills the vacant evaluate field 414 in a manner specified by a set of radio buttons 415 through 418. The button set includes, for example, a "none" button 415 which enters no data (or does nothing), a "CDOM" button 416 which fills each vacant Evaluate field 414 with the value of a corresponding CDOM, a 1-evaluation button 417 which fills the vacant Evaluate fields 414 with all 1's, a 0-evaluation button 417 which fills the vacant Evaluate fields 414 with all 0's, and a "clear" button 419 for deleting all the data in the Evaluate fields 414. After blanket setting all the vacant Evaluate fields 414 by selecting one of the radio buttons 415 through 418, the operator has only to check the correctness of the value in the Evaluate field 414 of each of unevaluated samples or the records whose "settled CDOM" field 412 is vacant. It is noted that an Evaluate field 414 may be left vacant, i.e., the operator has not necessarily to fill all of the Evaluate fields. Also, the operator may enter a value inverse to that of the settled CDOM field 412. Thus evaluated value in filed 414 is registered in evaluated data set 18 in FIG. 1. In any case, a value entered in the Evaluate field 414 is written over the existing value, if any, in the corresponding field of the evaluated data set 18.

If there is no need of evaluation, the operator can terminate the screen 400 display by simply clicking an Exit button 403. If the operator wants to retry the sample selection without evaluating the samples currently displayed in the evaluation screen 400, then the user will click a return button 404.

Completing the evaluation step 28s in FIG. 2, the operator makes a check in step 29 (FIG. 2) to see if the CDOM values provided by the system are satisfactory. IF so, then since this means that the reference vector Ck and the DOM threshold Tk have been trained to a sufficiently satisfactory extent, the operator ends the parameter training process 2 either by simply clicking the exit button 403 or by clearing the Evaluate fields 414 through button 419 and clicking the OK button 406. Otherwise, the operator clicks OK button 406 to reflect the evaluation input values to the reference vector Ck.

In response to the clicking of OK button 406, the control is passed to the parameter updater 30, which updates the classification parameters in step 30s (FIG. 2). Specifically, parameter updater 30 copies the values in the Evaluate fields 414 to corresponding cells in an evaluated CDOM table shown in FIG. 430. As seen from the above description, it is noted that the evaluate data set 18 corresponds to the entire data in a column or field of the evaluated CDOM table 430. The evaluated CDOM table 430 is a matrix of evaluated values in which one axis corresponds to the category number 1 through K and the other axis corresponds to the document number 1 through N (and document identifiers IDi). A vacant cell indicates that the document associated with the vacant cell has not yet evaluated for the category associated with the vacant cell. On updating the evaluated CDOM table 430, the parameter updater 30 calculates the reference vector Ck by using the evaluated CDOM values in the k-th fields in the table 430, the CDOM values, in the calculation result file 16, of the samples having not been evaluated for the category Ck and feature vectors stored in the sample document file 11 on the basis of equations (4) and (5). Then, the parameter updater 30 writes the new reference vector over the old one in the category data file 14, and ends the updating step 30s. Thereafter, the operator restarts a new training cycle from step 24s.

As described above, according to the principles of the invention, the operator can effectively select appropriate evaluation target samples by using evaluation sample selection diagram box 264 which provides a high degree of freedom in selection parameter setting and various graphs which provide information useful for deciding the selection range. Also, the evaluation of the calculation result is greatly facilitated by evaluation support subsystem 28 which provides a graphical user interface 400 and a blanket setting function 415 through 419.

In addition to the parameter training capability based on the CDOM evaluation and parameter updating, the classification parameter generating system is preferably provided with a parameter editor which permits the user to directly edit any parameter such as a component of a reference vector, a threshold value, various weighting factors (detailed later), etc.

In the above embodiment, after the completion of evaluation process (i.e., the activation of the OK button 406 in FIG. 10), the parameter updater 30 has updated the classification parameters immediately. Alternatively, the parameter updater 30 may be so configured as to display the classification results for the same category that will be obtained after the parameter updating based on the evaluation just done by the operator to let the operator review the classification results and to actually update the parameters in response to a reception of an input indicative of the approval by the operator.

1.3. Other Features

In order to introduce the basic concept of the invention in an early stage of the description, we have omitted some of the features. Such omitted features are detailed in the following.

1.3.1. Evaluation Sample Selection Based on a Distribution Function

If the distribution function selection button 288 is operated in the selection range specifying box 282 of FIG. 7, then the evaluation target selector 26 displays a distribution function selection screen as shown in FIG. 13. In FIG. 13, there are shown a uniform distribution function 442, a left-emphasized distribution function 444, a right-emphasized distribution function 446, a both end-emphasized distribution function 448, a center-emphasized distribution function 450 and a user-definable distribution function 452. The user can select a desired one of these distributions by clicking a corresponding button. If the user selects the user-definable graph 452, then clicking a predetermined button 454 enables the operator to define his/her own graph of a desired distribution characteristic with a graphic editor or to modify a prepared graph to a desired shape. It is assumed that the left-emphasized distribution function 444 has been selected in FIG. 13. After selecting a desired function, the operator clicks the OK button 456 to proceed to the next processing step.

Figure 14:
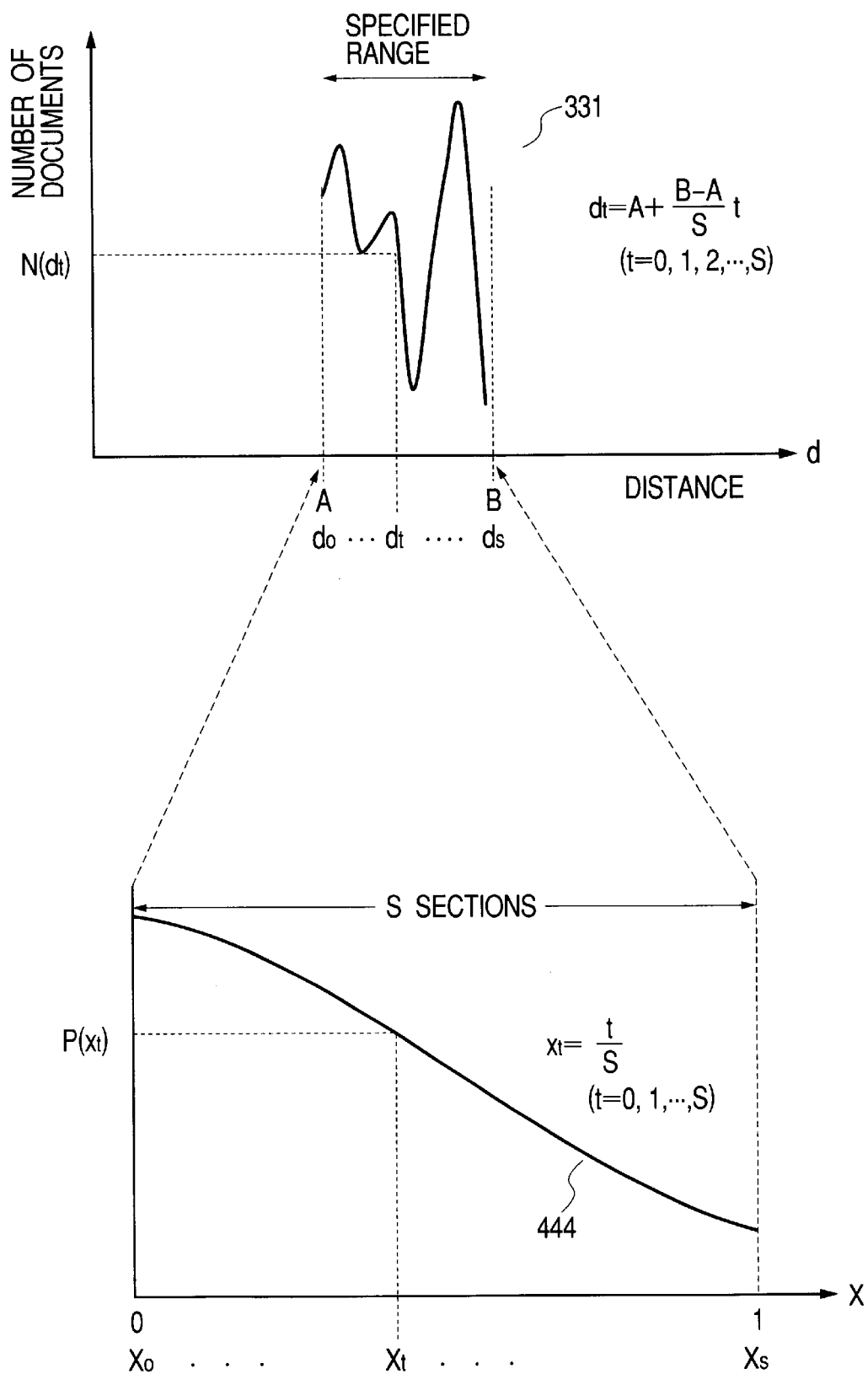
FIG. 14 is a diagram showing a illustrating how a probability distribution function is applied to a document distribution function such as shown in FIG. 8 or 9 to extract evaluation samples from the sample set 11.

FIG. 14 is a diagram illustrating how a probability distribution function is applied to a document distribution function such as shown in FIG. 8 or 9 to extract evaluation samples from the sample set 11. As shown in FIG. 14, a user-specified range (from A to B) of the document distribution 331 of FIG. 8 and the domain (from 0 to 1) of a selected probability function 444 are divided into S sampling sections or blocks. Then, the values of the S+1 boundaries from a to b in the graph 331 are expressed as $d_t = A + \{(B-A)/S\} \cdot t$ (t=0, 1, 2, ..., S). Similarly, the value of the S+1 boundaries from 0 to 1 in the graph 444 are expressed as $x_t = t/S$ (t=0, 1, 2, ..., S).

Also, in the distribution function-based sampling scheme, a specified total number (TN) of sample documents are extracted from the S sections in a specified range (A~B) of the document distribution 331 according to the specified distribution function 444. Thus, the operator has to set the sample range A~B, the number S of sections and the total number TN of samples as the sampling conditions.

Figure 15:
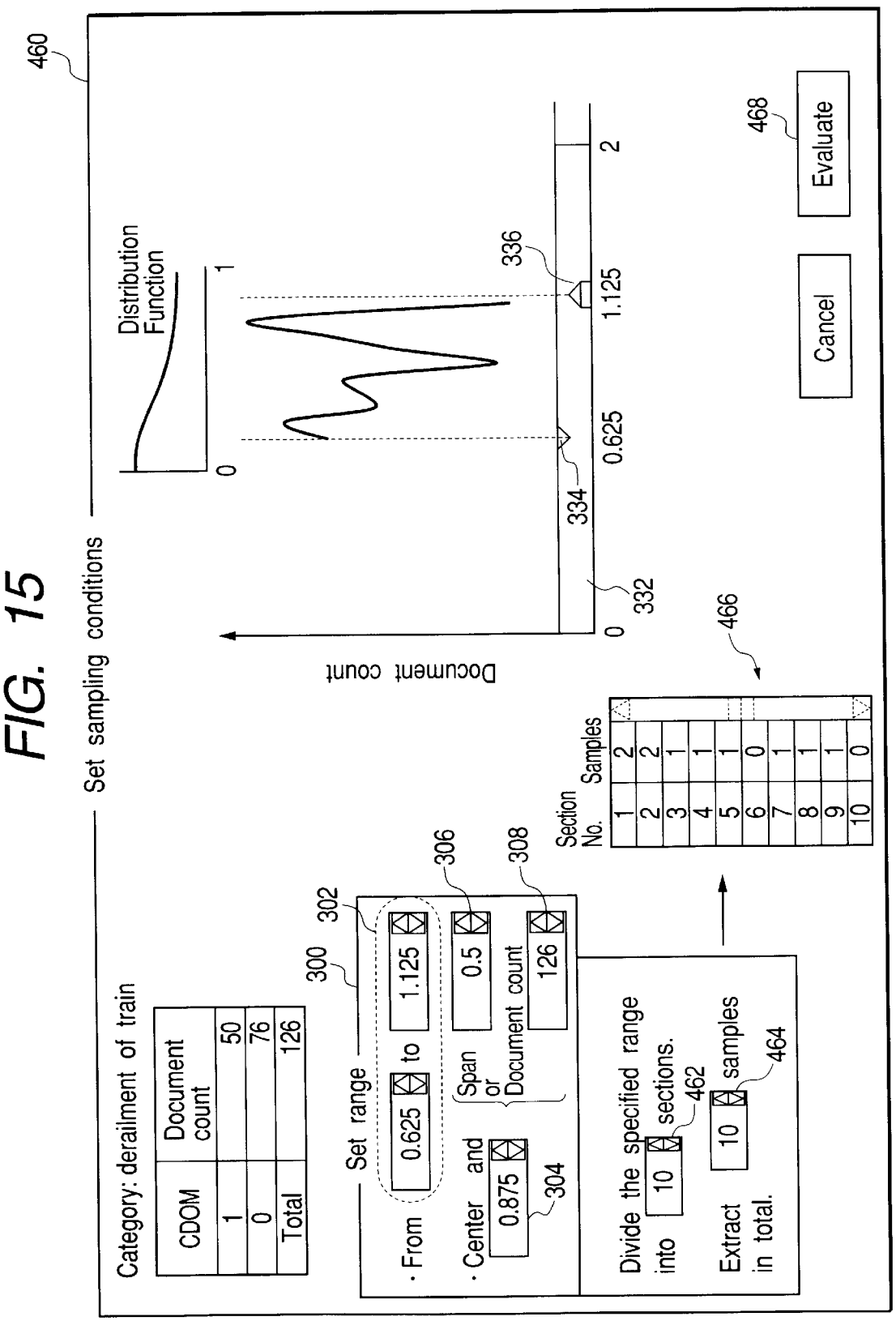
FIG. 15 is a diagram showing an exemplary sampling condition setting screen displayed in response to a clicking of OK button 456 of FIG. 13.

For this purpose, the evaluation target selector 26 displays a sampling condition setting screen in response to the clicking of OK button 456. FIG. 15 shows an example of the sampling condition setting screen. In FIG. 15, the operator determines the range A~B in the same manner as in case of FIG. 8 by using software switches 302 through 308 and/or 332 through 336. The operator further specifies the sampling section counts S and the total number TN by using respective input columns 462 and 464. In this specific example, it is assumed that the sampling range A~B is so set as to include the entire 126 documents of the sample set 11, resulting in A and B being 0.625 and 1.125, and both the section count S and the total number TN of samples to be extracted are set to 10.

Setting the values A~B, S and TN causes the evaluation target selector 26 to immediately distributes 10 samples to the 10 section according to the probability distribution function 444, i.e., to calculate the number $N_t$ of samples to be extracted from each section. The number $N_t$ is calculated as $$N_t = \frac{N(d_t) \cdot p(x_t)}{\sum_{t=1}^{S} N(d_t) \cdot p(x_t)} \cdot TN \tag{7}$$

Figure 16:
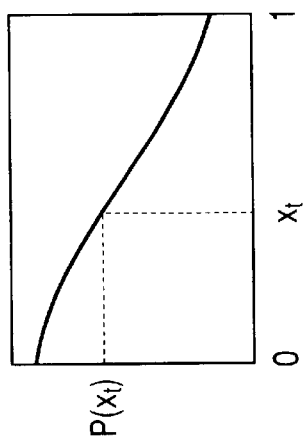
FIG. 16 is a diagram for illustrating the way of calculating the number of samples to be extracted from each of the sampling sections or blocks in a specified range in a document distribution according to the probability distribution function of FIG. 14.

FIG. 16 shows an example of extracted sample count calculation for each section in the above-assumed case. Thus calculated numbers $N_1, N_2, \ldots, N_S$ for 10 sections are immediately displayed in a sample count calculation result displaying portion 466 in FIG. 15. If the operator is satisfied with the calculation results $N_1, N_2, \ldots, N_S$, then he/she clicks a predetermined button 468 to evaluate S samples, which causes a display of extracted sample evaluation screen as shown in FIG. 10.

Also, an evaluation target selection may be so controlled by using the distribution function-based evaluation target-sampling scheme as to make the distribution of the ever-evaluated documents generate a desired curve. Specifically, if the evaluated documents that have been selected so far are distributed more densely in smaller DOS or distance side for example when viewed from the current standard, then the uniformly distributed function may be selected as the probability distribution function (i.e., more documents of larger DOS are selected) in a evaluation target selection of the current training cycle so as to cause the entity of documents to which the document that are current evaluation targets were added to distribute uniformly when viewed in the current standard.

Figure 17:
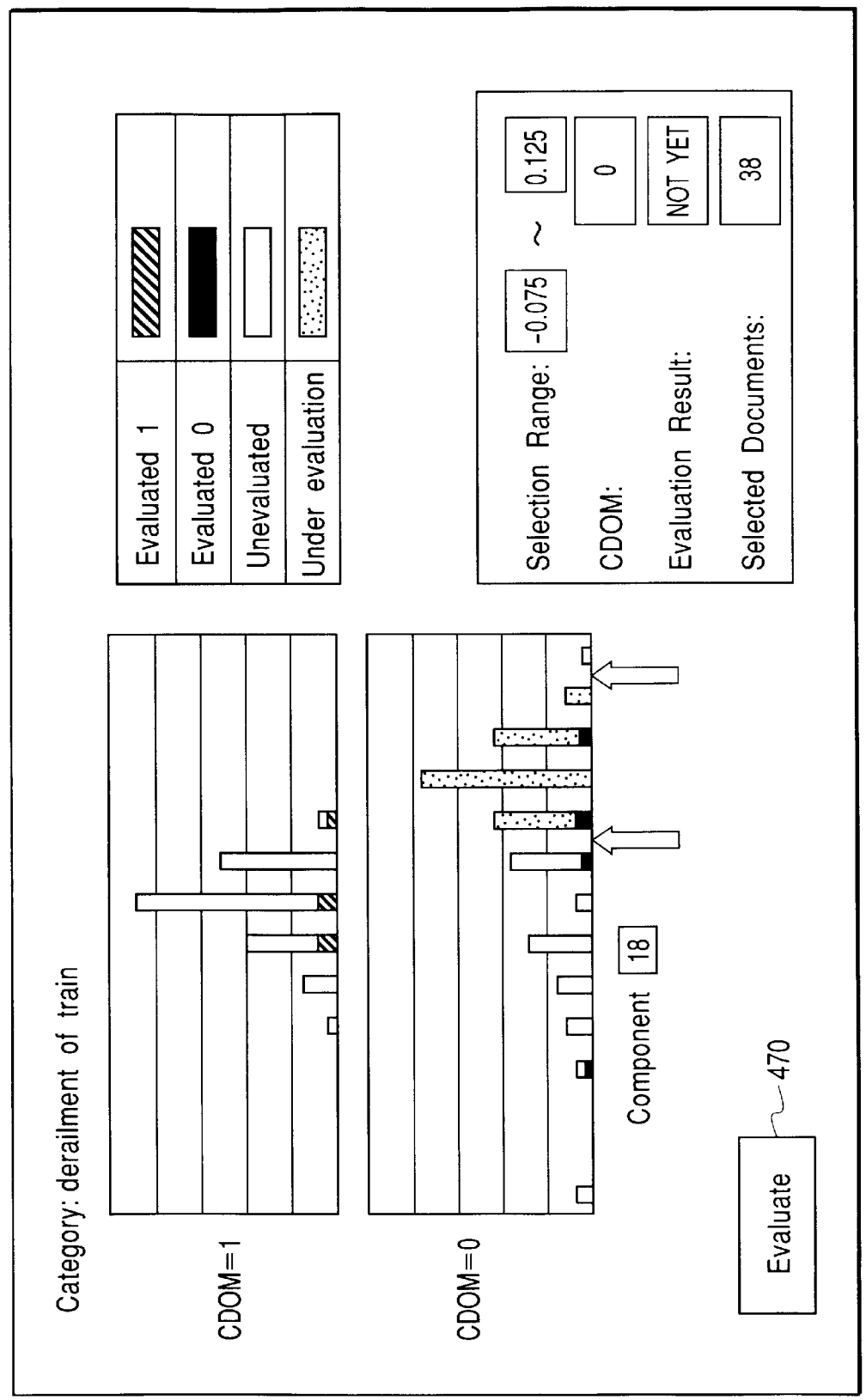
FIG. 17 is a diagram showing another example of an evaluation sample selection screen in which respective graphs are shown for the two values 1 and 0 of CDOM.

FIG. 17 is a diagram showing another example of an evaluation sample selection screen in which respective graphs are shown for the two values 1 and 0 of CDOM. In FIG. 17, the documents for which the CDOM is set 1 by the system and evaluated the same by the operator are labeled "Evaluated 1" and shown slashed bars; the documents for which the CDOM is set 0 by the system and evaluated the same by the operator are labeled "Evaluated 0" and shown by black bars; the documents which have never been evaluated so far by the operator are labeled "not yet" and shown by white bars; and the documents being selected for evaluation is labeled "Under evaluation" and shown by bars with a dot pattern. The number of documents "Under evaluation" is also indicated.

FIG. 18 partially shows two examples of the calculation result evaluation display provided when an "Evaluate" button 470 is clicked in FIG. 17 (these tables are actually displayed in an manner like FIG. 10). FIG. 18A is a displayed table when evaluation data sampling is done by using a left-emphasized distribution function and setting the total sample number TN to 10. FIG. 18B is a displayed table when evaluation data selection is done by taking the first 10 samples or documents from a list of samples arranged in the ascending order of DOS value. FIG. 10B only includes correct answers shorter in distance. However, FIG. 10A includes not only correct answers of shorter distances but also correct answers larger in distance.

As seen from the above description, probability distribution function-based sampling scheme is vary useful for sparsely evaluating a wide or the entire range of an ordered sample list. In this sense, the distribution function-based sampling is preferable used in calculation result evaluation in an early stage of parameter training.

1.3.2. Further Selection Based on Evaluation Target Selection Results

Further document search may be carried out based on one or entire documents obtained from an above-described evaluation target selection. Two additional search schemes are introduced in the following.

1.3.2.1. Selection Based on the Degree of Similarity to a Seed Document

In order to enable the operator to utilize this function effectively, it is preferable for a calculation result evaluation screen as shown in FIG. 10 to be provided with a column 320 that informs the operator of availability of this function and includes a kind of software switch to make sure if the operator desires to use this function. If so, then the document ID of a document selected in the table 410 is displayed in the column 320.

If an OK button 322 is clicked, then the system 1 calculates the degree of similarity (the distance in this specific example) between a feature vector DI of the selected or seed document DI and a feature vector Di (i≠I in this case)

of each of the other documents contained in the sample set 11 of FIG. 1. Checking the calculated degree of membership of each document Di, the system 1 arranges the documents opposite, in membership, to the seed document in order from the document of the smallest degree of similarity (or the smallest in distance) to the seed document to make a similarity-descending list; and also arranges the documents of the same CDOM as that of the seed document in order from the document of the largest degree of similarity (or the largest in distance) to the seed document to make a similarity-ascending list.

(It should be noted that when the value of CDOM is necessary as in just described case, the above-described evaluated CDOM table is first searched for the value. If the search is successful, then the found value is used as the CDOM. Otherwise, the corresponding unevaluated CDOM value in the calculation result data set 16 is used as the CDOM.)

Then, the system 1 displays a first list that contains the predetermined number of first documents in the similarity-descending list and a second list that contains a predetermined number of first documents in the similarity-ascending list.

Figure 19:
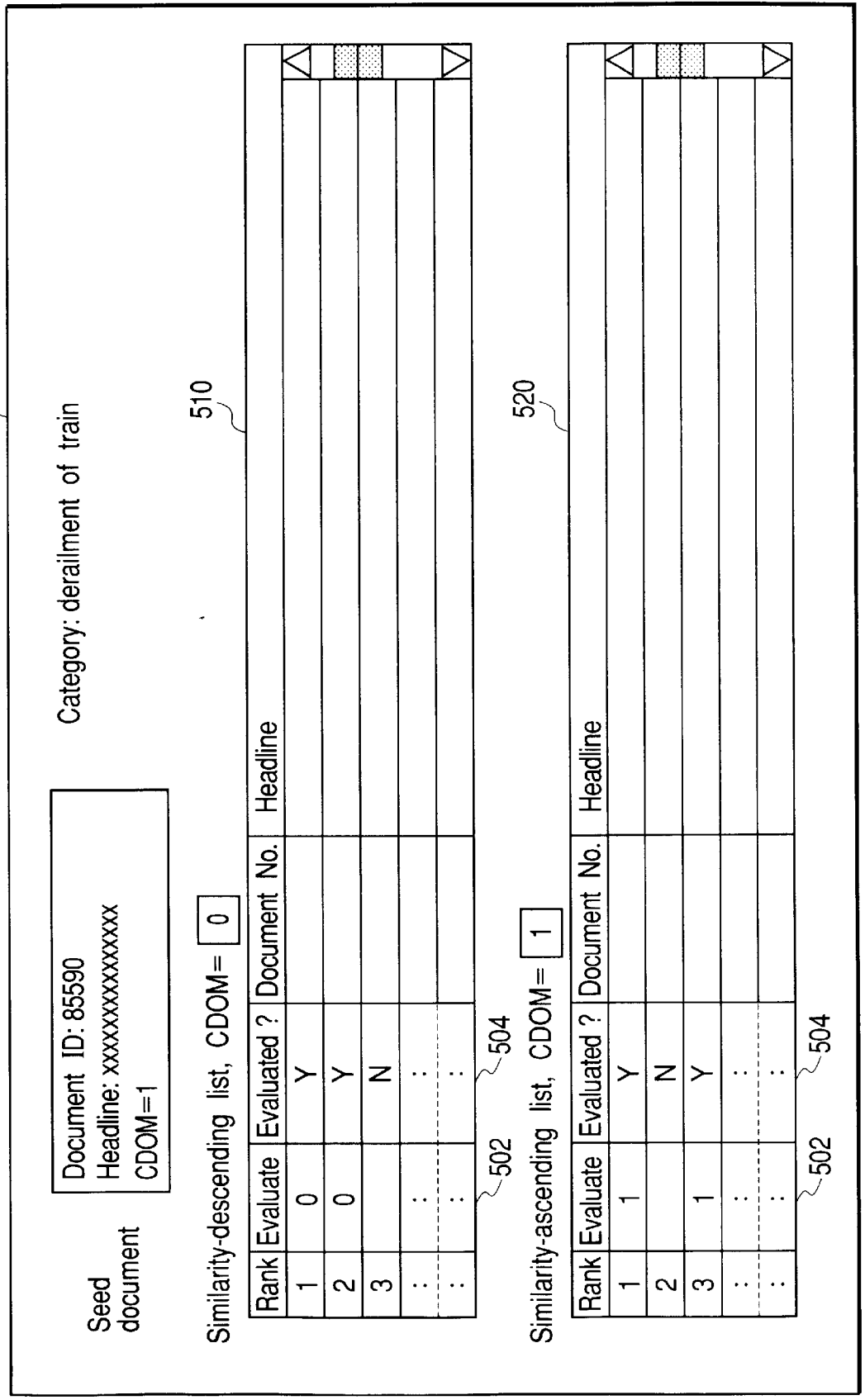
FIG. 19 is a diagram showing an example of an evaluation screen displayed in response to a degree of similarity-based selection command issued in a calculation result evaluation screen of FIG. 10 by clicking button 322.

FIG. 19 shows an example evaluation screen 500 including the first and second lists. The evaluation screen 500 includes information on the seed document, the above-mentioned first (or similarity-descending list) 510 and the above-mentioned second (or similarity-ascending list) 520.

Since the seed document (document ID=85590 in this example) has a CDOM value of 1, documents that is high in similarity to the seed document and has a CDOM value of 0 are displayed in order from the most similar document; and documents that is low in similarity to the seed document and has a CDOM value of 1 are displayed in order from the least similar document.

Each record of the two displayed lists contains a serial number, the document number and the headline of each document. Further, each record contains a "Evaluated?" field 502 which stores a value ("Y" or "N" for example) indicative of whether the CDOM of the document for category Ck ("derailment of train" in this specific example) and an evaluation value entry field 504 labeled "Evaluate" in which the operator can input a desired CDOM value.

Documents which is high in similarity to the seed document but different in CDOM or documents which is low in similarity but the same in CDOM may have wrong CDOM values. For this, reviewing the CDOM values in the two lists contributes to the effective improvement of the classification parameters.

The above-described evaluation of documents selected on the basis of the DOS to the seed document is especially useful for improvement of classification parameters if, as the seed document, there is used the document that belongs to the category and is closest to the DOM threshold Tk and/or a document that does nor belong to the category and is closest to the DOM threshold Tk.

1.3.2.2. Key Word Extraction and Search

The system 1 is preferably so arranged as to enable the operator to issue a key word extraction/search command in any of the evaluation target selection condition-designating screen of FIG. 7 and evaluation sample selection screens of FIGS. 8 and 9 by using a radio button 310 and an execution button 310 labeled "Get key words".

If the "get key words" button is operated before clicking the OK button 298 in FIG. 7 or the "Evaluate" button 316 in FIG. 8 or 7, then the evaluation target selector 26 extracts one or more key words common to the documents falls within the range defined by the values input by the operator and displays the extracted keyword(s). This permits the operator to prepare a retrieval condition by using the displayed key word(s) and execute a retrieval with the prepared retrieval condition to get a new set of evaluation target documents. This case results in the operator evaluating the new document set instead of the first selected documents selected in FIG. 7, 8 or 9.

Alternatively, the operator can also evaluate the key word-extracted and retrieved documents after evaluating the documents selected in any of FIGS. 7 through 9 by first clicking the OK button 298 in FIG. 7 or the evaluate button 316 in FIGS. 8 and 9 and then clicking the Return button 404 after evaluation in the calculation result evaluation screen 400. In this case, both of the first selected documents and the key word searched documents are evaluated, raising the efficiency of classification parameter updating process.

It is also noted that a combination of the key word extraction function and the vector component-based evaluation target selection can be used for adjustment of weights used in the weighted distance. A weight version of the distance (3) is expressed, for example, as:

$$DOS_{i,k} = d_{i,k} = \sqrt{\sum_{j=1}^{M} w_i \cdot (a_{i,j} - c_{k,j})^2}, \tag{8}$$

Specifically, if a longer interval exists between a first peak of smaller DOS (i.e., smaller distance) and a second peak of larger DOS (i.e., larger distance) in a vector component-based document distribution graph for a certain vector component as shown in FIG. 9, then only a key word extraction is executed for a document set in the neighborhood of each of the first and second peaks. Then, a weight corresponding to each of the obtained key words is adjusted according to the position in the component axis and the document number at the position.

1.3.3. Inter-Category CDOM Coupling

According to the principles of the invention, it is possible to include, in a record for each category, an inclusive category list (ICL) 530 that contains IDs of categories in which the category is included and/or an exclusive category list (ECL) 540 that contains IDs of categories that have an incompatible relationship with the category. This enables the inclusive relationship and the exclusive relationship between categories to be utilized for CDOM evaluation.

If there are categories, for example, Cx (="accident") and Cy (="derailment of train") in the category set 14, then since the category Cy is included in Cx, a document that belongs to Cy never fails to belong to Cx. In this case, the creator (or operator) of the category data set 14 adds the ID of the including category Cx to the ICL field 530 of the included category Cy record. Doing this enables the following operation.

If the CDOM of a sample i for a category k has been evaluated to be 1 in the evaluation step 28s of FIG. 2, then the system 1 evaluates the CDOM of the sample i for each of the categories identified by the category IDs contained in the ICL field 530 of the category record of category k to 1, which is called "an inclusive relation-based evaluation". And, the inclusive relation-based evaluation is recursively applied to each of the categories for which the CDOM has been set to 1 in the last inclusive relation-based evaluation.

Also, it is possible that if a sample i has a certain CDOM value for one category Ck, then the sample i must not have the same CDOM value for a certain other category Cm, and vice versa. In this case, the categories Ck and Cm are in an incompatible relationship. The operator of the category data set 14 adds the ID of one category Ck or Cm to the ECL field 540 of the other category Cm or Ck record, respectively. Doing this enables the following operation.

If the CDOM of a sample i for a category k has been evaluated to one of two values in the evaluation step 28s of FIG. 2, then the system 1 evaluates the CDOM of the sample i for each of the categories identified by the category IDs contained in the ECL field 540 of the category record of the category k to the other value, which is called "an incompatible relation-based evaluation". The incompatible relation-based evaluation is recursively applied to each of the categories for which the CDOM has been set to the other value in the last inclusive relation-based evaluation.

1.3.4. Previous and Current CDOM Value Comparison

According to the principles of the invention, the DOS & CDOM calculator 24 retains the CDOM(n) values calculated in the last training cycle as well as the CDOM(n+1) values calculated in the current training cycle. This enables the operator to know the differences between the calculation results before (b) and after (n+1) the classification parameter update.

Figure 20:
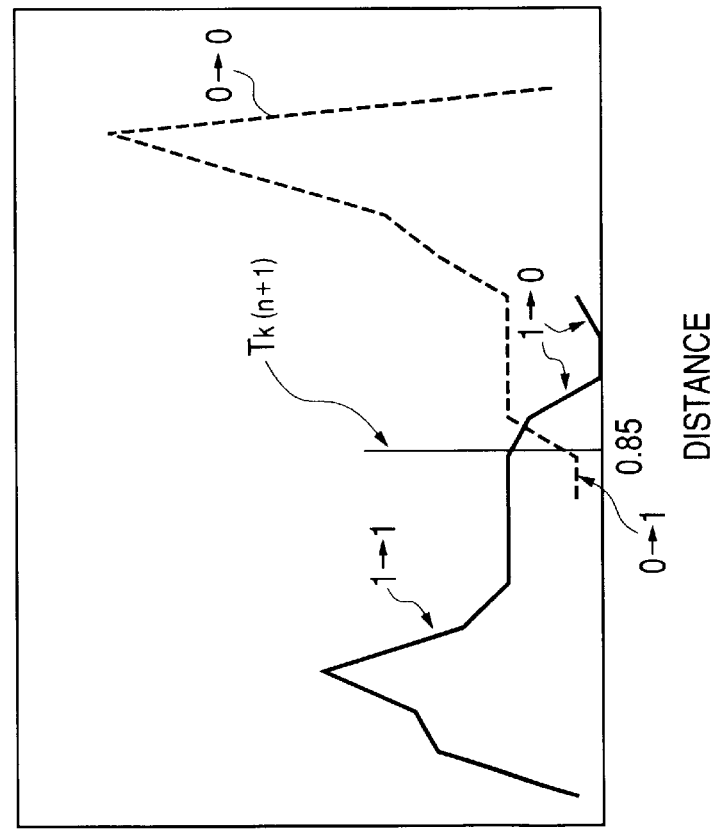
FIG. 20 is a diagram showing an example of a calculation result comparison screen.

FIG. 20 is a diagram showing an example of a calculation result comparison screen. In FIG. 20, the distribution of the documents the CDOM value of which was 1 (i.e., the documents for CDOM(n)=1) is plotted in a solid line; and the distribution of the documents the CDOM value of which was 0 (i.e., the documents for CDOM(n)=0) is plotted in a broken line. The documents that have kept a CDOM value of 1 before and after the parameter update correspond to a graph portion and a check box that are labeled "1→1". The documents that have changed from 1 to 0 in the CDOM value before and after the parameter update correspond to a graph portion and a check box that are labeled "1→0". The documents that have changed from 0 to 1 in the CDOM value before and after the parameter update correspond to a graph portion and a check box that are labeled "0→1". And, the documents that have kept a CDOM value of 0 before and after the parameter update correspond to a graph portion and a check box that are labeled "0→0". Clicking a graph portion or a check box with a desired one of the above labels can cause the associated documents to be selected and displayed on the screen.

In this graph, the smaller the number of documents that have experienced either change in CDOM (i.e., the documents labeled 1→0 or 0→1) is, the closer to a convergence the classification parameters are.

Figure 21:
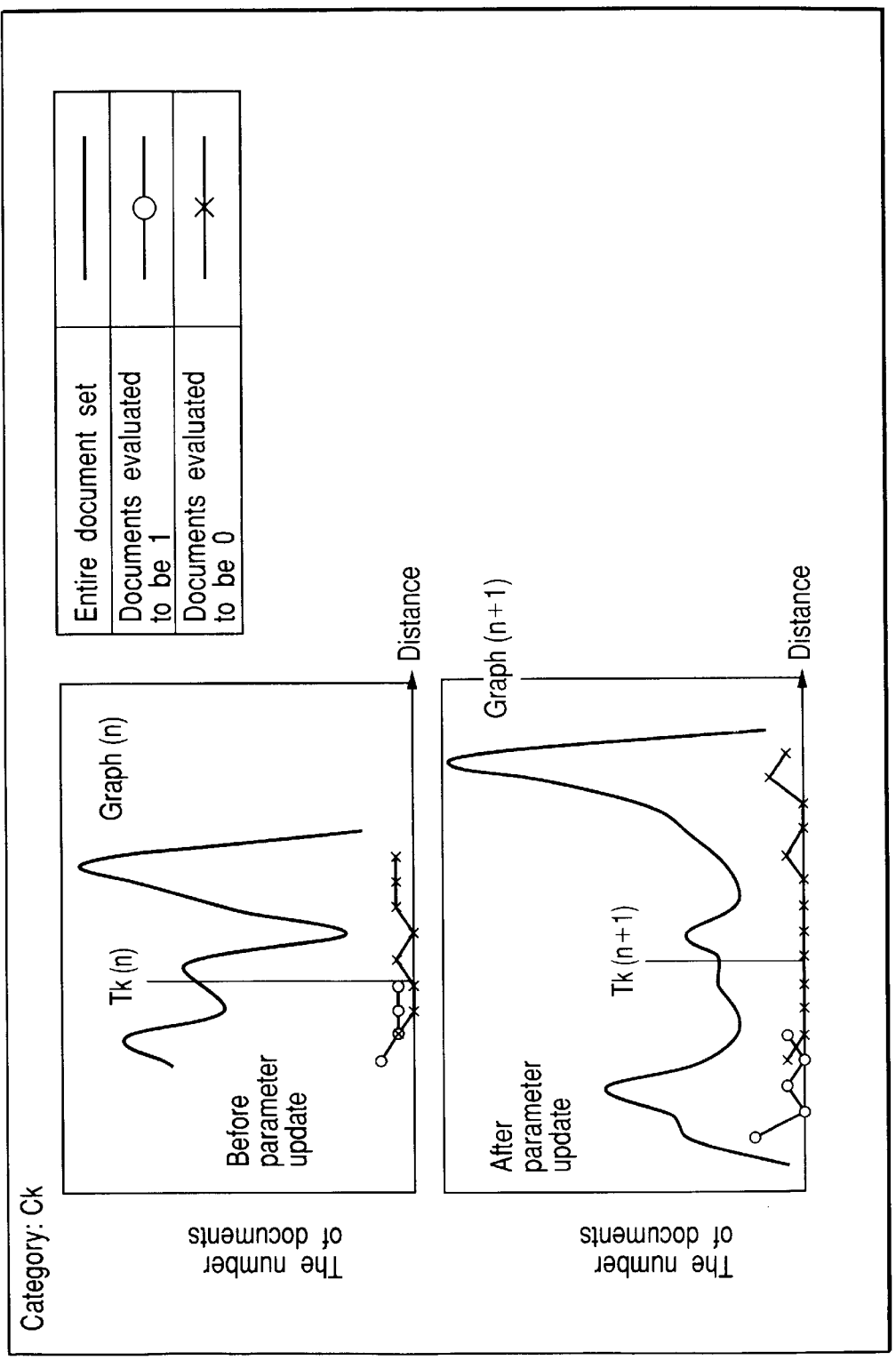
FIG. 21 is a diagram showing another example of the calculation result comparison screen.

Retaining the DOS values before the parameter update (referred to as "DOS(n)") in addition to the CDOM(n) values makes it possible to display another calculation result comparison screen as shown in FIG. 21. The calculation result comparison screen of FIG. 21 includes a graph (n) showing the calculation results before the parameter update and a graph (n+1) showing the calculation results after the parameter update. In both the graphs, each solid line indicates the distribution of the entire documents, each of small circle-linking lines indicates the distribution of the documents whose CDOM values have been evaluated to be 1, and each of small x-linking lines indicates the distribution of the documents whose CDOM values have been evaluated to be 0 in the last training cycle.

The above described comparison screens of FIGS. 20 and 21 are useful for deciding the position (or level) of the classification threshold Tk and the timing of termination of training.

1.3.5. Parameter Quality Check by the Hitting Rate in CDOM Calculation

Figure 22:
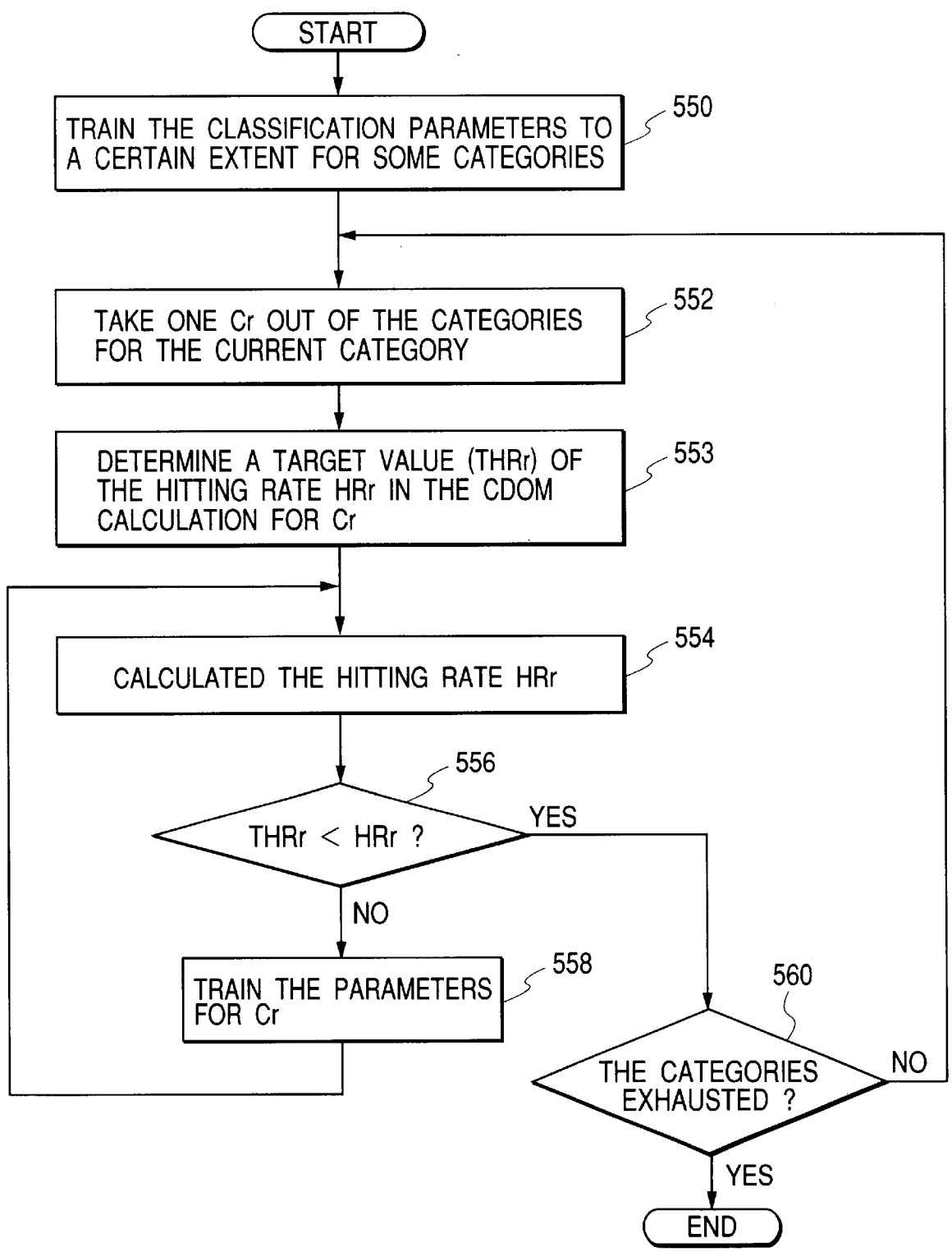
FIG. 22 is a flowchart showing an operation for raising the quality of parameters for each of given categories to a predetermined level by using the hitting rate in CDOM calculation.

FIG. 22 is a flowchart showing an operation for raising the quality of parameter for each of given categories to a predetermined level by using the hitting rate in CDOM calculation. In FIG. 22, the operator trains the parameters for some categories to some extent in step 550. One Cr of the categories is made the current category in step 552. Then, in step 554, the system 1 calculates the hitting rate HRr for the category Cr according to the following equation:

$$HRr = HDNr/EDNr, \quad (9)$$

where HDNr is the number of documents whose CDOM and evaluated CDOM equal each other for the category Cr and EDNr is the number of documents whose CDOM for the category Cr has been evaluated.

The system 1 makes a test to see if the hitting rate HRr is equal to or larger than a preset target-hitting rate THRr in step 556. If not, then since it is considered that the parameters need more training for the category Cr, the system 1 executes a predetermined number of training cycles in step 558 and returns to step 554.

If the test result is YES in step 556, then since it is considered that the parameter has been sufficiently trained for the category Cr, the system 1 makes another test to see if the category has been exhausted in step 560. If not, then the control is passed to step 552. If the categories have been exhausted in step 560, then the system 1 ends the process.

Though the parameters for Cr has been trained in step 558, the category Cr may be deleted from the category set 14 if possible.

As described above, the parameter quality checking scheme of the invention excludes categories that yield over-standard results from the training-required category set, raising the efficiency of the CDOM calculation parameters training, which results in a generation of high-accuracy CDOM calculation parameters.

2. Embodiment II.

Figure 23:
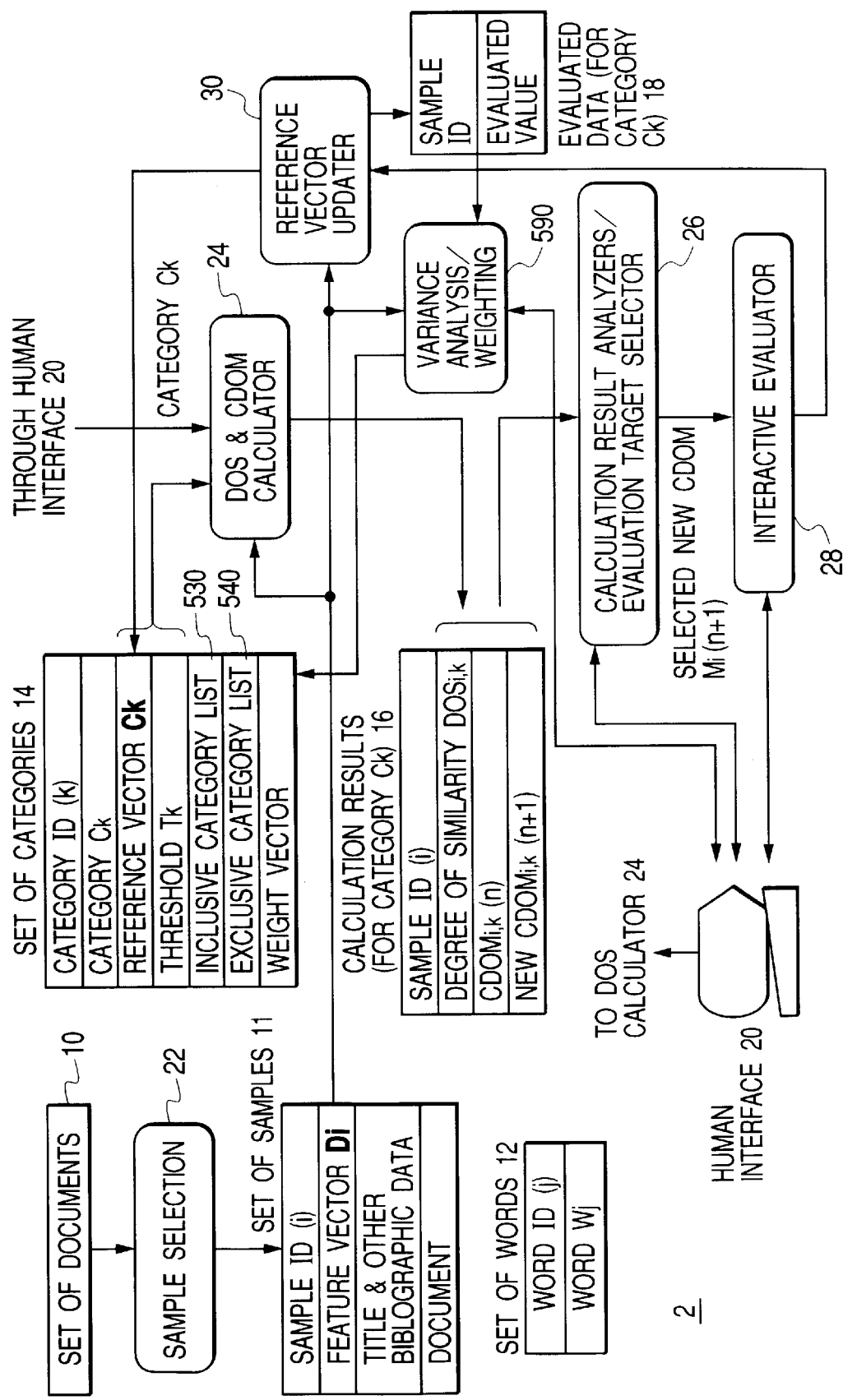
FIG. 23 is a schematic block diagram showing an arrangement of a classification parameter generating system in accordance with a second illustrative embodiment of the invention.

FIG. 23 is a schematic block diagram showing an exemplary classification parameter generating system 2 in accordance with a second illustrative embodiment of the invention. In FIG. 23, classification parameter generating system 2 is identical to that of FIG. 1 except that a variance analysis/weighting subsystem 590 has been added.

According to the present invention, the system 2 provides an interactive graph-based variance analyzer for interactively analyzing the extent to which each of the vector components contributes to the resolution of CDOM. On the basis of the analysis, the operator can narrow the vector components used for calculation of the CDOM and put respective weights to the vector components according to respective contribution to the CDOM resolution. For this purpose, the system 2 provides various pieces of information.

The analysis and weighting is done for each Ck of the possible categories. The system 2 first searches the column for category Ck in the evaluated CDOM table 430 of FIG. 12 to obtain a first subset of documents whose evaluated CDOM is 1 and a second subset of documents whose evaluated CDOM is 0. It is assumed that the first and second subsets consist of N1 documents and N2 documents, respectively. Since the two subsets are similarly treated, we only describe the first subset. The first subset N1 documents are expressed by the feature vectors $\{Dx|x=1, 2, \ldots, x, \ldots N1\}$. Each feature vector of the first subset is expressed as $Dx=(a_{x,1}, a_{x,2}, a_{x,j}, \ldots, a_{x,M})$. Similarly, each feature vector of the second subset is expressed as $Dy=(a_{y,1}, a_{y,2}, \ldots, a_{y,j}, \ldots, a_{y,M})$.

Then, the system 2 calculates, for each vector component j (j=1, 2, ..., M), the mean $\mu(1)_j$ of the j-th components of the N1 documents of the first subset as:

$$\mu(1)_j = \frac{1}{N1} \cdot \sum_{x=1}^{N1} a_{x,j}, \quad (10)$$

where (1) of $\mu(1)_j$ indicates that the mean is for the first subset.

Further, system 2 calculates, for each vector component j, the variance $\sigma(1)_j^2$ of each x (x=1, 2, ..., N1) of the j-th components of the N1 documents of the first subset as:

$$\sigma(1)_j^2 = \sum_{x=1}^{N1} (a_{x,j} - \mu(1)_j)^2. \quad (11)$$

Similar calculations for the second subset yields:

$$\mu(2)_j = \frac{1}{N2} \cdot \sum_{y=1}^{N2} a_{y,j}, \text{ and } \sigma(2)_j^2 = \sum_{y=1}^{N2} (a_{y,j} - \mu(2)_j)^2. \quad (12)$$

In the course of parameter training, the user is preferably permitted to issue a variance analysis command. Responsively, by using the evaluated CDOM table 430, the feature vectors Di (i=1~N) in the sample set 11 and the above four equations (10)~(12), the system 2 calculates, for each of the M vector components, the mean and the variances of N1 documents with CDOM=1 and the mean and the variances of N2 documents with CDOM=0 as shown in FIG. 26.

FIG. 24 is a diagram showing an example of a variance calculation result display screen 570. In FIG. 24, the screen 570 displays tables 583 and 584 and graphs 581 and 582. In each table 583 or 584, pairs of variance and vector component number are displayed in the ascending order of the variance. The table 583 and the graph 581 are for documents with the CDOM evaluated to be 1. The table 584 and the graph 582 are for documents with the CDOM evaluated to be 0. The horizontal axis of each graph indicates the variance of vector components of the specified dimension (477 in the example of FIG. 24) for the documents with CDOM=1 or 0. The graphs 851 and 582 have switch 572 attached so as to specify a desired variance value. The tables 583 and 584 have slide switch 574 attached so as to specify a desired component number. The screen 570 also includes a vector component number specifying field 576, which is locked to the switch 574.

Figure 25:
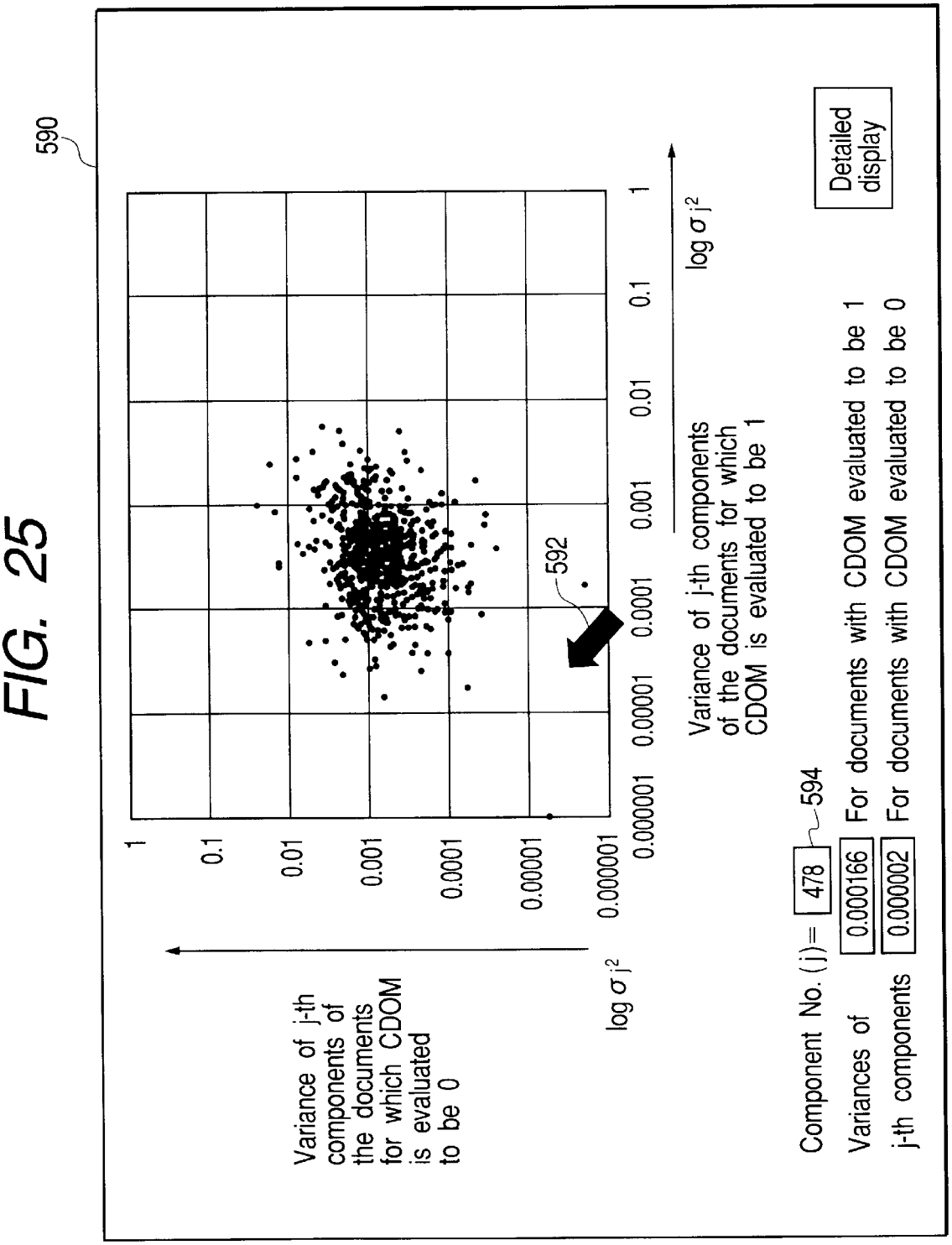
FIG. 25 is a diagram showing another example of the calculation result-displaying screen 590.

FIG. 25 is a diagram showing another example of the calculation result-displaying screen 590. The screen 590 includes a vector component map which shoes a distribution of the vector components. The horizontal axis of the map indicates the variance of documents with CDOM=1 which variance is calculated with respective to the specified vector components (478-th component in the example of FIG. 25). The vertical axis of the map indicates the variance of documents with CDOM=0 which variance is calculated with respective to the specified vector components. The vector component is specified by either a cursor 592 or the numeral input field 594, which are locked to each other. The variance of j-th components is shown for each of document sets for CDOM=1 and 0.

As seen from the above display screens, what is useful is a vector component for the variance is smaller and the variance value where the documents for which CDOM is evaluated to be 1 and the variance value where the documents for which CDOM is evaluated to be 0 are less overlap each other. On the contrary, it is noted that such a vector component as cause the variance value where the documents for which CDOM is evaluated to be 1 to overlap the variance value where the documents for which CDOM is evaluated to be 0 is not effective.

Also, the system 2 preferably calculates at least one kind of weight wj for each vector component as shown below.

$$w_j = 1/\sigma(1)_j \quad (13)$$

$$w_j = |\mu(1)_j - \mu(0)_j|/\sigma(1)_j \quad (14)$$

$$w_j = |\mu(1)_j - \mu(0)_j|/\{\sigma(1)_j + \sigma(0)_j\} \quad (15)$$

where $\sigma(1)_j$ is the standard deviation of j-th components of the documents for which CDOM is evaluated to be 1; $\mu(1)_j$ is the mean of the j-th components of the documents for which CDOM is evaluated to be 1; and (0) indicates that the quantity is calculated for the documents for which CDOM is evaluated to be 0.

In expression (13), the weight is calculated only considering the vector components of the documents with CDOM=1. Expression (14) further includes the difference between the mean of the documents with CDOM=1 and the mean of the documents with CDOM=1. Expression (15) further includes the variance of the components of the documents for which CDOM is evaluated to be 0. It is noted that the above-introduced weight expressions are only three examples of possible weight expressions that use the mean and/or the standard deviation. For this, any suitable weight expression or equation other than those listed above may be used.

The system 2 further calculates the above-described weights for each vector components as shown in FIG. 26.

The component weight calculated with equation (14) is suitable for the criterion to select an effective vector component as a reference vector component. Also, the component weight calculated by equation (13) is suitable for use in the distance calculation.

In FIG. 26, the rightmost three columns containing the calculated weight values are preferably so configured as to be sensitive to a click. Specifically, if the operator clicks a weight value of, for example, equation (14) to put the clicked weight to an associated vector component (j), then the system 2 applies the clicked weight to the corresponding component $c_{k,j}$ of the reference vector $Ck=(c_{k,1}, C_{k,2}, c_{k,1}, \ldots, c_{k,M})$ of the category Ck.

The calculation of a weighted reference vector is achieved by multiplying each component $c_{k,j}$ of the reference vector Ck by a corresponding weight $w_j$ and normalizing the multiplied reference vector so as to cause the length of the multiplied reference vector to become 1. The used weight is stored as a part of classification parameters.

Also, weights may be used in the calculation of the distance (or DOS) between a feature vector of a document and a reference vector of a given category. This is achieved by multiplying each component of a feature vector by a corresponding component of any desired weight vector, normalizing the weight-multiplied feature vector so as cause the length of the he weight-multiplied feature vector to be 1, and calculating the distance between the weighted feature vector and the above-mentioned weighted reference vector in a usual way.

As described above, putting heaver weights to effective components of the reference and putting lighter or 0 weights to ineffective components enables the generation of a high-accuracy DOS calculating parameters. If a weight value is smaller than a certain extent in table of FIG. 26, then it is preferable to use 0 as the weight value instead of using such a small weight value as it is.

Further, the classification parameter generating system 1 is preferably provided with a weight adjusting function. Specifically, the operator can issue a predetermined command specifying a category and a range of weight. The system 1 responsively displays a table which is similar to that of FIG. 26 but only contains records for the reference vector components having been given a weight within the specified range. In this display screen, the operator can freely change the value of each of the displayed weights. This enables the operator to know which of the components have significant weights and which have less significant weights, which helps the operator adjust the value of a desired component on the basis of intuitive judgment on whether the current weight value of the component is suitable or not.

3. Embodiment III

Expansion of Sample Set 11 and Category Set 14

Figure 27:
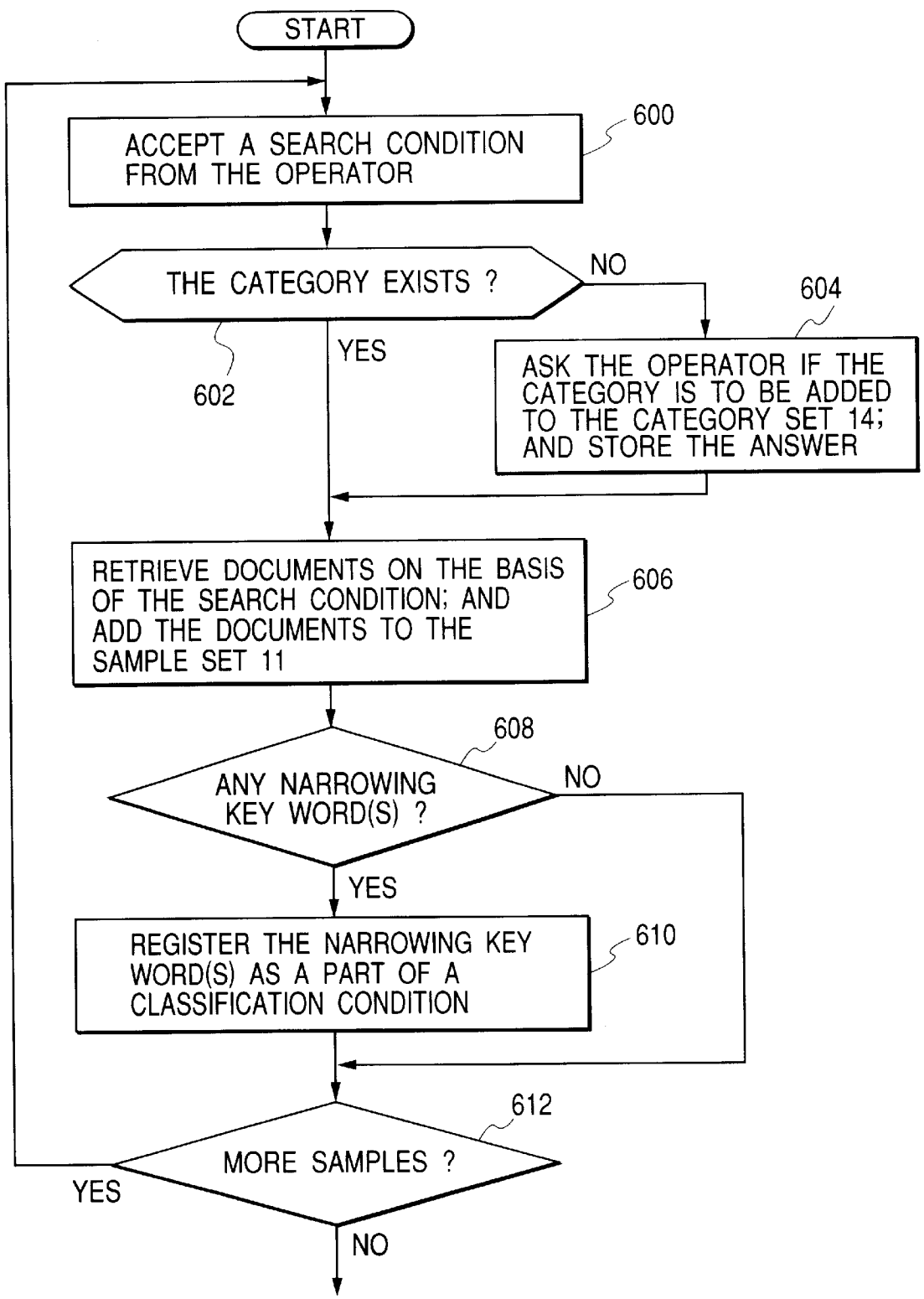
FIG. 27 is a flowchart showing an exemplary operation executed under the control of sample selector 22 in accordance with a third embodiment of the invention.
Figure 30:
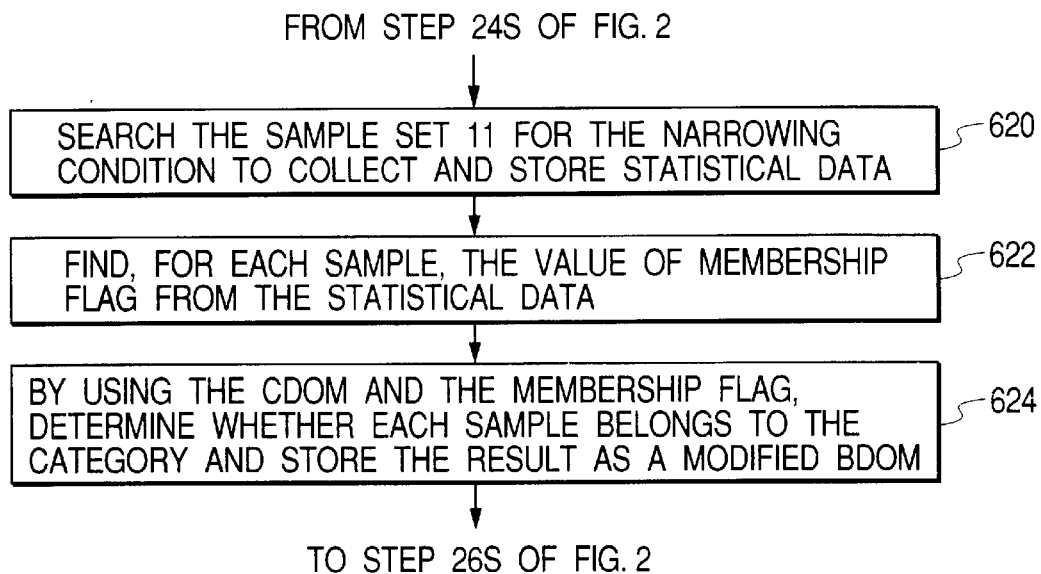
FIG. 30 is a partial flow chart showing the CDOM modifying process inserted between steps 24s and 26s in FIG. 2.

A classification parameter generating system or text classifier with parameter generating capability in accordance with a third embodiment of the invention is substantially identical to that of FIG. 1 except that: in this embodiment, the sample selector 22 has a sample set 11 expansion function effected by the operation as shown in FIG. 27; and a CDOM modifying process shown in FIG. 30 is inserted between steps 24s and 26s in FIG. 2.

In the present classification parameter generating system, the operator is permitted to issue an expanding command through the human interface 20. Responsively, the sample selector 22 is invoked and the operation of FIG. 27 is started. In FIG. 27, the selector 22 first displays a search condition entry screen as shown in FIG. 28 to prompt the user to enter a search condition and accept the data entered by the operator in step 600. In FIG. 28, the operator inputs a classification category, e.g., "bugs in program", and key words for search. If the operator desires to use one or more of the entered key words as a narrowing condition for narrowing the result of the DOS & CDOM calculator 24, then he/she marks desired key word(s) by clicking a check box associated with each of the desired key word(s). In this specific example, it is assumed that a word "bug" is marked.

In step 602, a test is made to see if the specified category exists in the category set 14 in step 602. If not, then proceeding to step 604, the selector 22 displays a message to this effect; asks the operator if he/she desires to add the entered category to the set 14 of category; and according to his/her answer, the selector 22 stores, in a predetermined memory location, a value indicative of whether the category should be added to the category set 14.

Then, the selector 22 retrieves documents from the set 10 of document by using the entered key words ("bug" and "program" in this specific example) and adds the obtained documents to the set 11 of samples in step 604. The selector 22 makes a test to see if any of the key words are marked as the narrowing condition in step 608. If so, the marked key word(s), e.g., "bug", is/are registered as a CDOM calculation condition in an appropriate location of the category data set 14 in step 610. FIG. 29 shows an exemplary manner of a narrowing condition 618 being stored in category data table 14. In step 612, a decision is made on whether more documents should be added to the document set 11. If so, the control is passed to step 600. Otherwise, the CPU ends the operation of sample selector 22 and proceeds to step 220 or 210 of FIG. 2 according to the stored answer. Specifically, if the entered category is to be added to the category set 14, then the control is passed to step 220. Otherwise, the control is passed to step 210.

As described above, if the sample set 11 is expanded for a certain category and if any key word is given as a narrowing condition, then the key word is retained in as the narrowing condition for the category.

It is also noted that the expansion function of this embodiment can expand not only the document set 11 but also the category set 14.

In this embodiment, following step 24s, the control is passed to step 620, in which the CPU searches the sample set 11 for the narrowing condition to collect and store statistical data of each sample. In step 622, the CPU determines from the statistical data whether each of the samples in sample set 11 belongs to the specified category and stores the determination result as a membership flag, which takes a value of 1 when the sample belongs to the category or a value of 0 when the sample does not belong to the category. Since the narrowing condition, the statistical data and the way of determination are interrelated, these matters can be determined in many ways. The simplest scheme is to assume that the narrowing condition is a single word; the statistical data is the number of occurrences of the word in each sample; and whether each sample belongs to the specified category is determined through a comparison between the number and a predetermined threshold. This threshold may be 1, in which case the statistical data may is a piece of information indicative of whether each sample includes the word.

Then, using the CDOM and the membership flag, the CPU determines whether each sample belongs to the category and stores the result as a modified CDOM in step 624. The determination in this step is made in a manner as defined in the following table.

TABLE

| | | CDOM | Membership flag | Modified CDOM |
|---|---|---|---|---|
| Four possible cases | 1 | 1 | 1 | 1 |
| | 2 | 1 | 0 | 0 |
| | 3 | 0 | 1 | 0 |
| | 4 | 0 | 0 | 0 |

That is, the value of MODIFIED CDOM is given as a logical sum of the CDOM calculated in step 24s and the value of membership flag in this embodiment.

If this MODIFIED CDOM decision rule is applied to, for example, a document in which "bug" fixing is discussed by using a word "software" instead of a word "program", then this document has certainly a difference between "program" and "software" but is not so different in usage of other words, causing the CDOM to be 1. Since the membership flag is of course 1, the MODIFIED CDOM becomes 1. This corresponds case 1 in the above table.

In case of a document that does not include a word "bug" but is similar, in the way of occurrence of other words, to documents dealing with debugging as in case of documents concerning software troubles other than bugs, since the membership flag, which is determined by a search condition "bug", is zero, the final result or MODIFIED CDOM becomes 0 even if the CDOM is 1. This corresponds case 2 in the above table.

In case of a document that includes a word "bug" which is used in the meaning of some kinds of insects but is different from documents concerning the debugging in usage of other words, since the CDOM which is determined by a classification reference which has been created by using documents including both "bug" and "program", the CDOM is 0, causing the MODIFIED CDOM to be 0. This corresponds case 3 in the above table.

In case of a specific example of the above table, it is seen that the value of the membership flag has no effect on the modified CDOM if the calculated CDOM is zero. For this reason, searches for the marked key word has to be done only in the documents the CDOM of which has been calculated to be 1. In this case, only ones of the searched documents that contain the narrowing key word "bug" are valued as 1 for the modified CDOM.

According to the present embodiment, the operator can obtain a set of samples for a category through a document search by providing a search condition. Specifying any of the key words in the search condition causes the specified one to be automatically added to the CDOM calculating parameter as the narrowing condition.

A classification parameter generating system in accordance with the present embodiment may be arranged such that a set of document is obtained for each category by using respective search conditions for different categories and that a set of classification parameters are generated for documents of all the collected document sets.

In the above example, character strings are used. However, any suitable normal expression of characters, bibliographic data, etc. may be used as the search condition.

It is also possible to arrange the classification parameter generating system such that a plurality (L) of sets of documents is prepared for each of the categories by executing the plurality (L) of searches with respective search conditions for each category; a different set of classification parameters are generated and trained for each of the plurality (L) of document sets and stored in a separate manner; and in a practical CDOM calculation, the largest one of DOSs calculated from the 7 sets of classification parameters is used as the DOS. For example, the classification parameter generating system may be so configured as to retain, for a category "debug", a set of classification parameters generated from documents including a word "program" and a set of classification parameters generated from documents including a word "software" and, in practical classification, to calculate two DOS values by using respective parameter sets and use the larger one as the calculated DOS.

4. Embodiment IV: A Case of Reference Vectors Varying Statistically

In the above-described embodiments, the sample set 11 has been used. This is to limit the number of documents used in the train. However, the parameters that have been trained by using the same or sometimes expanded sample document do not always yield satisfactory results when practically used with an actual large set of documents. For coping with this problem, it is thought to be useful to select a different set of documents of a suitable number (say, the same number as the sample set 11) from the actual document set to use for training at each cycle of train. By doing this, the classification parameters can be trained over the entire set of document while limiting the number of documents used in each training iteration or cycle.

The selection of a different set of document in each of training iterations may be done in any suitable way. For example, the actual document set may be divided into a predetermined number of subsets, and the subsets may be used in sequence one by one. Or, a predetermined number of documents are selected at randomly from the actual document set. It is note that the set 11 of sample is not necessary; however a feature vector has to be calculated for each document of the document set 10 in advance.

Figure 31:
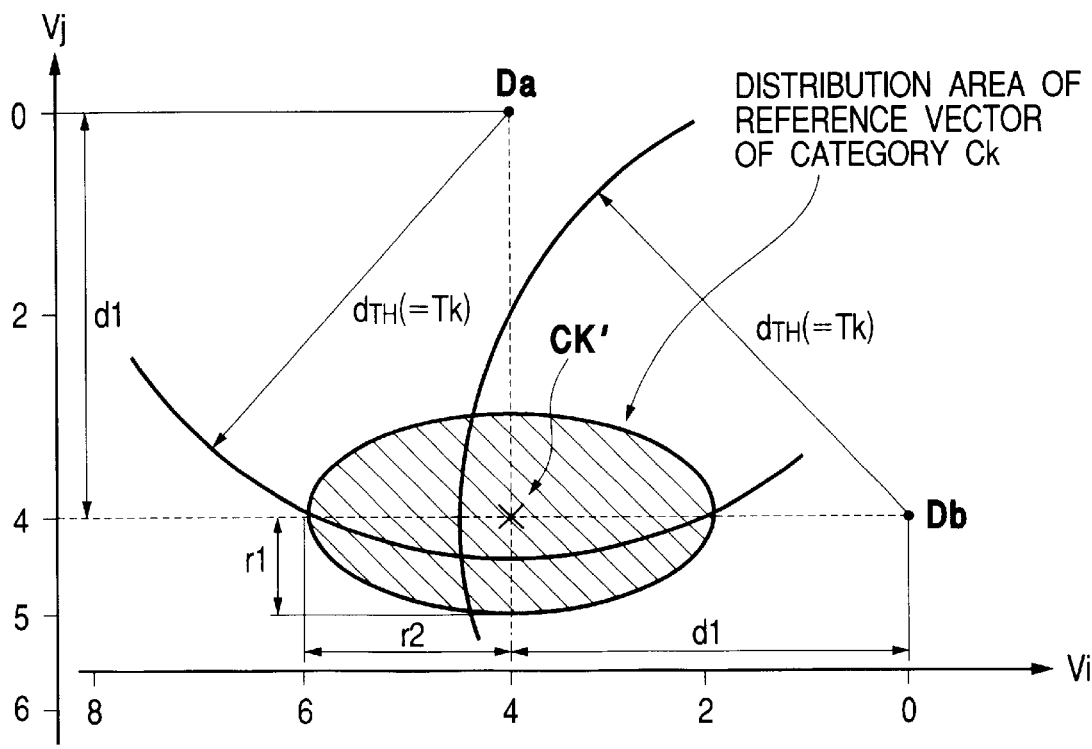
FIG. 31 is a diagram illustrating the concept of the distributive reference vector and the distance between the reference vector and each of two exemplary documents in the fourth embodiment.
Figure 32:
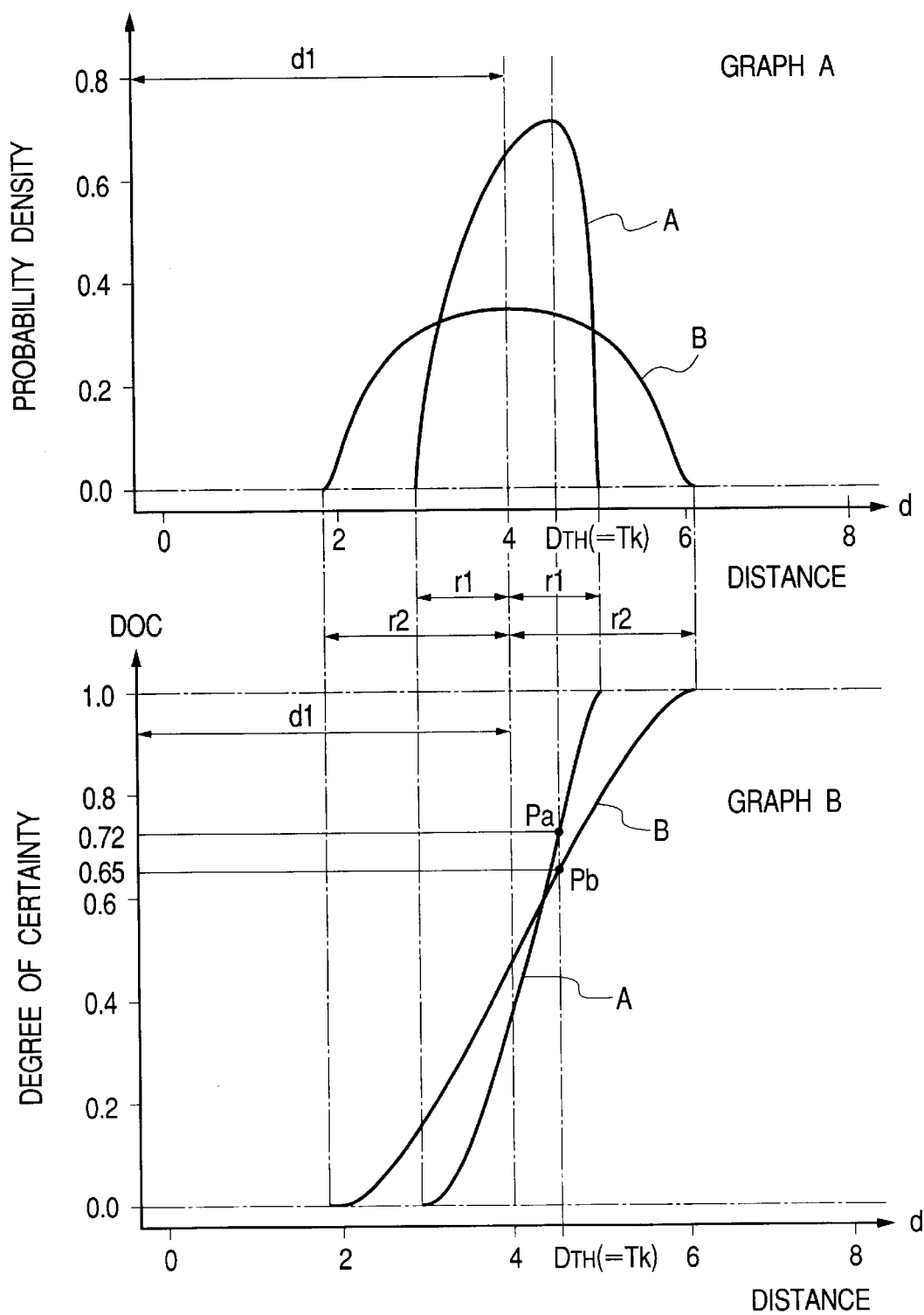
FIG. 32 shows graphs A and B wherein graph A shows the distribution of the probability density of belonging to the category and graph B shows the relationship between the distance to the center vector Ck' and the degree of certainty of belonging to the category.

We discuss the case of the latter selection scheme. In this case, the sample document set (a set of documents randomly selected in each cycle) is considered to change within a range of the actual document set. According, it is though thought that the reference vector of each category Ck is distributed around a certain center. FIG. 31 is a diagram illustrating the concept of the distributive reference vector and the distance between the reference vector and each of two exemplary documents in this embodiment. For the purpose of simplicity, only two dimensions are considered in FIG. 31. FIG. 32 shows graphs A and B for explaining how the evaluation target documents are selected if the degree of certainty is used as the selection criterion.

In FIG. 31, it is assumed that the reference vector of category Ck is distributed uniformly in an elliptic range. Then, it is thought that the center Ck' of the distribution range of the reference vector is the reference vector of the category found by using the entire actual document set. The vector Ck' is referred to as "the center vector" of the category Ck. The points Da and Db indicate the feature vectors of the documents A and B, respectively. The distances between the vector Da and the center vector Ck' and the distances between the vector Db and the center vector Ck' is together equal to d1. In this reference vector model (or sample set model), the probability that the document Da belongs to the category Ck is determined by the area within the distribution range which area is included in a circle with a center pointed by Da and a radius of $d_{TH}$, where $d_{TH}$ is a threshold distance set as the DOM threshold for the category Ck. Since the circle with the center pointed by vector Da and the radius of $d_{TH}$ includes a major part of the distribution range, while the circle with the center pointed by vector Db and the radius of $d_{TH}$ includes only more than half of the distribution range, it is seen that the probability that the document A belongs to the category Ck is larger than the probability that the document b belongs to the category Ck. r1 and r2 are a shorter and a longer radius of the distribution range of the center vector Ck'.

In FIG. 32, graph A shows the distribution of the probability density (indicated by the vertical axis) of belonging to the category Ck. Graph B shows the relationship between the distance from each document to the center vector Ck' and the degree of certainty that a document at that distance from the vector Ck' is determined to belong to the category Ck through the comparison between the DOS and the DOM threshold Tk (=$d_{TH}$ in this specific example). In both graphs A and B, the horizontal axis indicates the distance from each document to the center vector Ck' and curves labeled "A" and "B" are for the documents A and B, respectively. In graph B, the vertical axis indicates the above-mentioned degree of certainty (DOC). The curves A and B of graph B are obtained by integrating corresponding curves A and B of graph B.

In graph B, the degree of certainty that a document is determined to belong to the category Ck for which the DOM threshold Tk is $D_{TH}$ is determined by the DOC coordinate of the intersecting point between the curve for the document and the vertical line the d coordinate of which is $d_{TH}$. If the DOM threshold is 4.5 for example, then the degree of certainty for each document A (or B) being determined to belong to the category Ck is given by the DOC coordinate of the intersecting point Pa (or Pb) between each of the curves A and B and the vertical line of 4.5 in the d coordinate: i.e., 0.72 and 0.65, respectively. For this reason, if the operator selects "Degree of Certainty" as the selection criterion and sets the selection threshold to 0.7 in the evaluation sample selection screen of FIG. 7, then the document A is selected for a evaluation target, whereas the document B is not selected.

It is noted that one minus the degree of certainty for the CDOM=1 is equal to the degree of certainty that it is determined that the document does not belong to the category Ck.

This distributive reference vector model enables the generation of accurate classification parameters. In this embodiment, the degree of certainty can be selected as the selection criterion in the evaluation sample selection dialog box 264 in FIG. 7. It is noted that each time the reference vector Ck is calculated by using equation (4), a distribution of probability density has to be defined along each component of the reference vector which distribution is centered at the calculated component value. When the CDOM is calculated from the DOS and the DOM threshold Tk, the degree of certainty for the CDOM is also calculated. The other arrangement is identical to the first embodiment.

5. Embodiment V: Text Classifier 5.1. Basic Text Classifier

Figure 33:
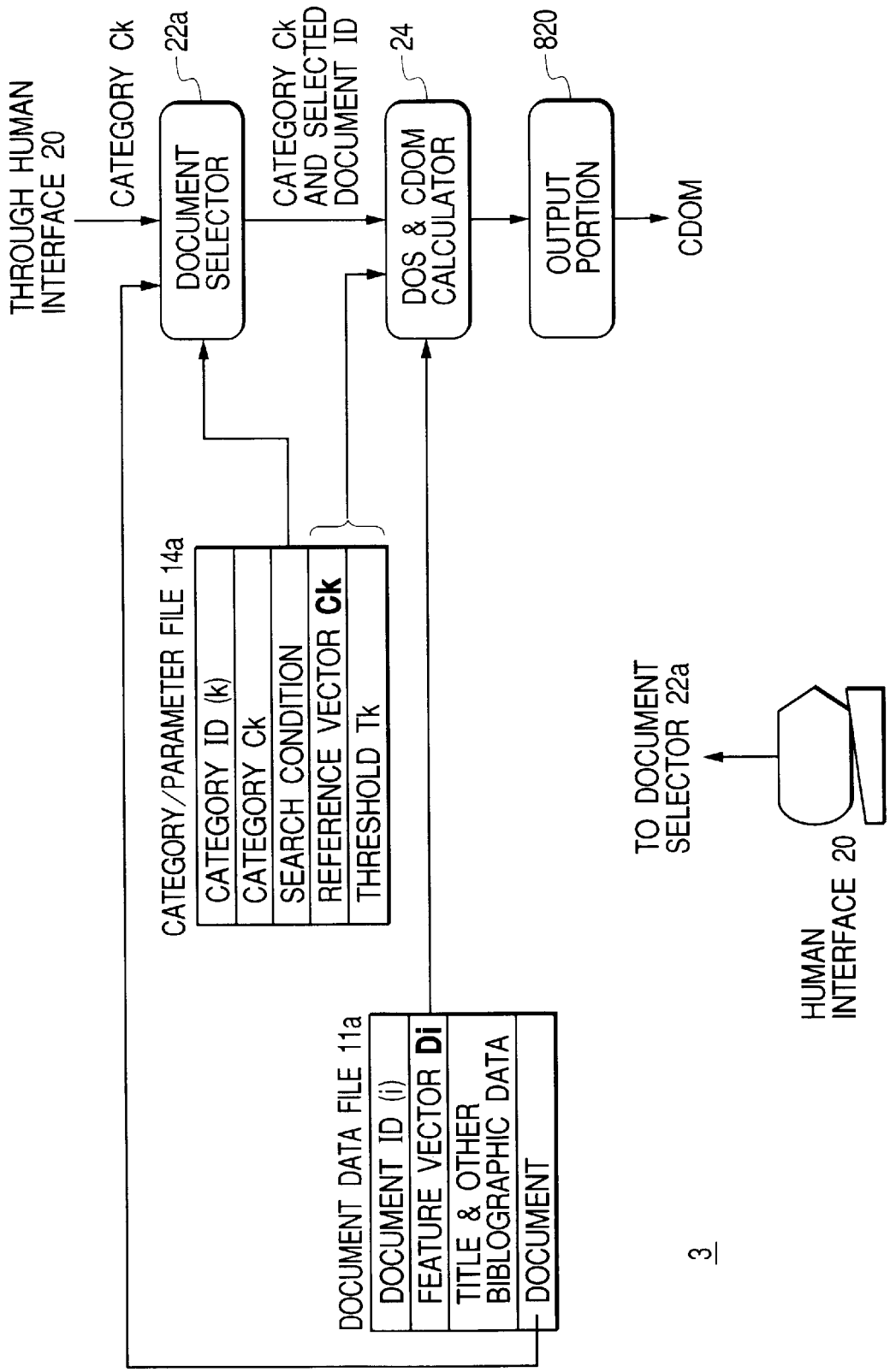
FIG. 33 is a schematic block diagram showing an arrangement of a system for calculating a membership score of a given document for a specified category by using classification parameters generated in accordance with the invention.

FIG. 33 is a schematic block diagram showing an arrangement of a system 3 for calculating a membership score of a given document for a specified category by using classification parameters generated in accordance with the invention. In FIG. 33, a system 3 comprises a document data file 11*a* which contains a set of practical documents and respective feature vectors; a category data file 14*a* which contains a set of categories and respective parameters which may include a search condition; a document selector 22*a;* the DOS (e.g., a weighted distance) and CDOM calculator 24, which is identical to that of FIG. 1; an output portion 820; and the human interface 20.

Figure 34:
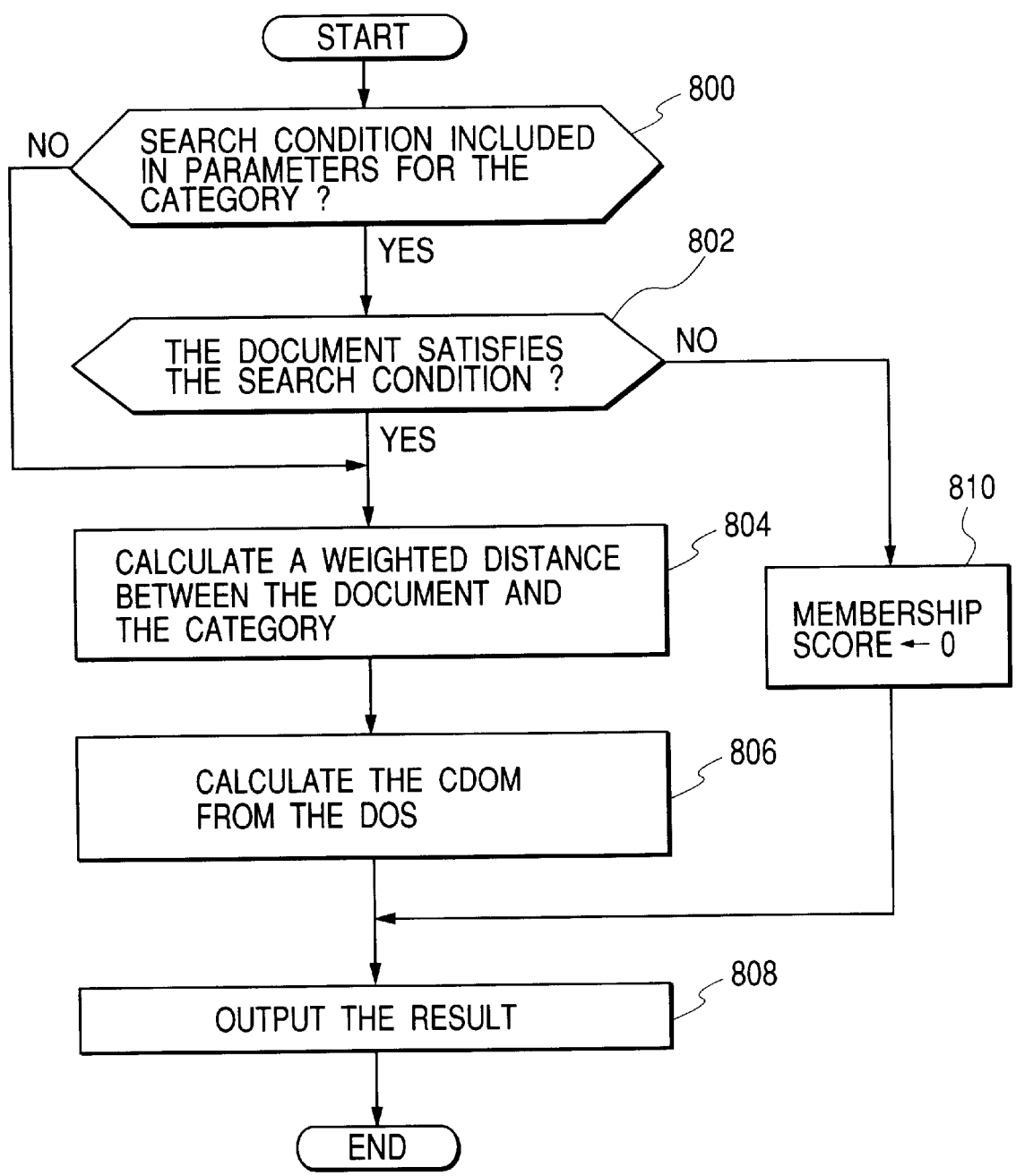
FIG. 34 is a flowchart showing an exemplary operation of the system of FIG. 33.

FIG. 34 is a flowchart showing an exemplary operation of the system 3. If a category or category ID and a document ID is specified by the operator, Then, the CPU of the system 3 starts the operation of FIG. 34. In step 800, the CPU first makes a test to see if any search condition is included in the parameters associated with the specified category in the category data file 14*a*. If not, the control is passed to step 804. If a search condition is found in step 800, then the CPU searches the specified document for the search condition to see if the document satisfies the search condition in step 802. If not, then the CPU sets a membership score to 0 in step 810.

(The expression "the membership score" is used in the same meaning as the CDOM or the membership flag.)

If the document satisfies the search condition in step 802, then the CPU calculates the DOS (e.g., the weighted distance between the reference vector of the specified document and the reference vector for the specified category defined by equation (8)) in step 804. Then, the CPU calculates the CDOM from the DOS in step 806, and outputs actually obtained one of the membership score and the CDOM as the result in step 808, which terminates the operation.

A collection of the documents belonging to a specified category is obtained by executing the operation of FIG. 34 for each of the documents in the document set 11*a*.

Though the above-described text classifier 3 is simple, it provides a raised-accuracy membership score by using well-trained classification parameters. However, since the text classifier 3 is not provided with a parameter generating and training capability, the text classifier 3 does not permit an addition of a new category to the category set 14*a*. In order to cope with an addition of a new category, it is preferable for a text classifier to be provided with a parameter generation and training capability.

5.2. Text Classifier with a Parameter Generation and Training Capability

The fundamental structure of a text classifier of this type is identical to that of the classification parameter generating system 1 (FIG. 1) or 2 (FIG. 23). The text classifier with a parameter generation and training capability fundamentally operates according to the flowchart of FIG. 34 in a practical use mode and in a manner described in sections before and including §4 in a training mode.

However, since the evaluated CDOM table 430 of FIG. 12 is provided, it is preferably be utilized. This is because a table look up operation for obtaining a desired CDOM is less time consuming than DOS and CDOM calculation operations.

Figure 35:
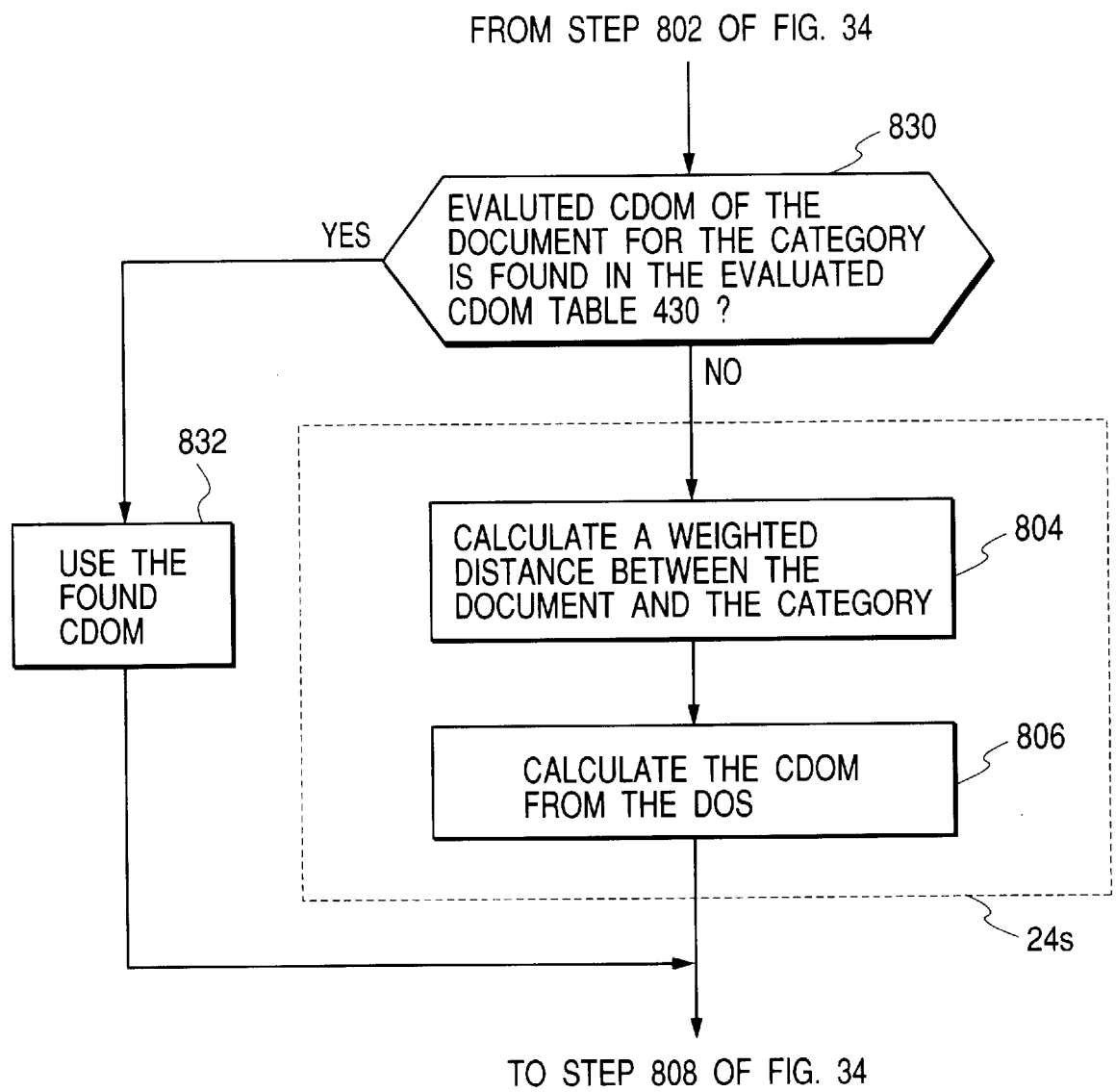
FIG. 35 is a partial flowchart showing additional steps that have to be added to a flow portion comprised of steps 804 and 806 in order to utilize the evaluated CDOM table 430.

FIG. 35 is a partial flowchart showing additional steps that have to be added to a flow portion comprised of steps 804 and 806 in order to utilize the evaluated CDOM table 430. In FIG. 35, an added flow portion is drawn in bold lines. Between steps 802 and 804, there is inserted a decision step 830, in which a test is made to see if the evaluated CDOM of the specified document for the specified category is found in the evaluated CDOM table 430. If so, the control is passed to step 804. Otherwise, the control is passed to the other additional step 832, where the found CDOM is passed to the output portion 820.

Figure 36:
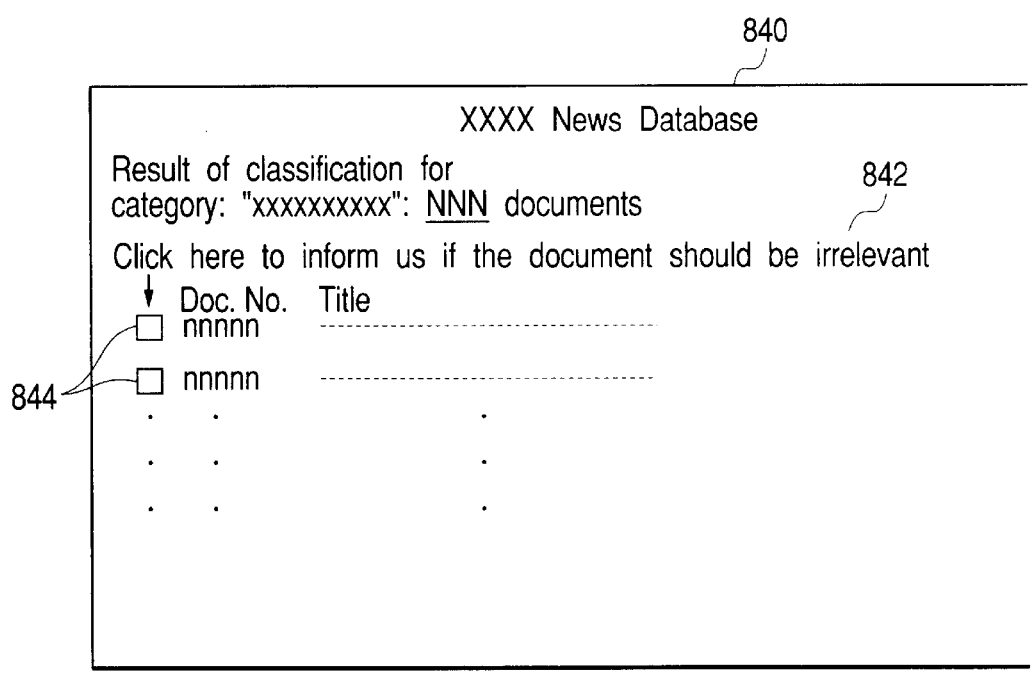
FIG. 36 is a diagram showing an example of a classification result display screen 840 displayed in response to a request for documents that belongs to a category specified by a user.

In this embodiment, the more evaluated CDOMs the table 430 contains, the more effective the CDOM calculation becomes. If evaluations by users of the text classifier are successfully utilized, then it will contribute to the increase in the number of evaluated CDOM in the evaluated CDOM table 430. FIG. 36 is a diagram showing an example of a classification result display screen 840 displayed in response to a request for documents that belongs to a category specified by a user. As shown in FIG. 36, it is preferable to provide, in addition to the classification result, a message 842 to encourage the user to inform the administrator of the classifier if an irrelevance of any document should be found and a check box 844 which is attached to each displayed document and is to be clicked for reporting the irrelevance.

Figure 37:
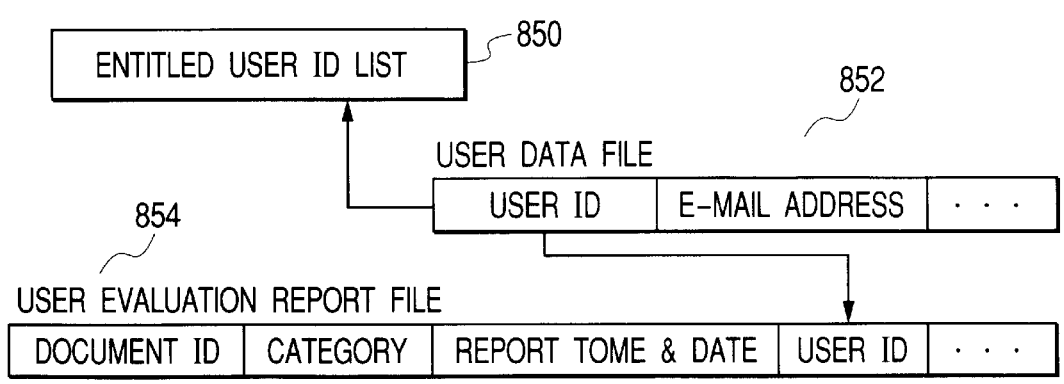
FIG. 37 is a diagram showing exemplary data files preferably used for permitting user evaluation with good security.

However, in this case, ordinary users and trustworthy user (e.g., members of the organization running the text classifier) are preferably discriminated from each other. For this purpose, the inventive classifier preferably includes files as shown in FIG. 37. Specifically, evaluation reports from trustworthy user who is registered in an entitled user ID list 850 may be directly reflected to the table 430. However, evaluation reports from the ordinary user who is not registered in the entitled user ID list 850 are once stored in a user evaluation report file 854, so that the CDOM values of the stored evaluation reports can be reviewed by the operator or administrator later. The user evaluation report file 854 includes a document ID, a category, a report time and date, a user ID who sent the report, etc. The inventive classifier further includes a user data file 852 for storing necessary information on the users.

Doing this contributes to a reduction of irrelevant document errors that erroneously set the CDOM to 1 when the DBOM should be actually 0.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system for generating a set of parameters for use in determining whether a given document belongs to a specified one of a plurality of predetermined categories, the system comprising:

a set of documents, each document having an identifier (ID);

a document data set containing a record for each document which record contains a document ID of said document and a feature vector representing features of said document in a predefined vector space;

a category data set containing a record for each category which record contains a category ID of said category, a category name and said set of parameters, said parameters including a reference vector representing features of said category in said predefined vector space and a threshold value for said category;

means for calculating, for each document (or the document), a membership score indicative of whether the document belongs to said specified category by using said feature vector of the document, and said reference vector and said threshold value associated with said specified category;

means for supporting an operator to input various command parameters for selecting documents for which the calculated membership scores are to be evaluated;

means, responsive to an input of one of said command parameters, for visually presenting information useful for said selection of documents to said operator;

evaluation means for displaying selected documents and permitting said operator to evaluate (i.e., set an evaluated membership score as) said membership score of each of the displayed selected documents;

means for storing said evaluated membership score, if exists, of each document for each of said predetermined categories; and means for updating said reference vector of said specified category by using said evaluated membership score, if exists, of each document in said storing means, said calculated membership scores of documents having not been evaluated for said specified category and feature vectors contained in said document data set.

2. A system as defined in claim 1, said means for calculating the membership score includes:

means for calculating a distance between said feature vector of each document and said reference vector of said specified category; and means for calculating said membership score from said calculated distances and said threshold.

3. A system as defined in claim 2, wherein said threshold is determined by a value possible to said distance, a function of the standard deviation of said distance, a number of documents first appearing in said set of documents arranged in ascending order of said distance and a ratio of documents belonging to said category to the entire documents, said ratio including a percentage.

4. A system as defined in claim 2, wherein said means for supporting an operator includes:

means for specifying one of predetermined selection criterions; and means for specifying a range of said specified selection criterion.

5. A system as defined in claim 4, wherein said means for specifying one selection criterion comprises means for specifying one of said distance, a position in a list of documents arranged in order of said distance and a desired one of the components of said feature vectors.

6. A system as defined in claim 4, wherein said means for specifying a range comprises means for specifying a desired one of the number of documents centered by said threshold, two boundary values and a graph-based specification option.

7. A system as defined in claim 5, wherein said means for supporting an operator includes means for specifying which of a row value and the deviation of said row value should be used in said specifying a range of said distance or said desired one of the components of said feature vectors.

8. A system as defined in claim 1, wherein said means for supporting an operator includes means for specifying for which group of unevaluated documents, all documents and evaluated documents only an operation of said selecting documents should be executed.

9. A system as defined in claim 6, wherein said means for visually presenting information includes means, responsive to a selection of said graph-based specification option, for displaying a document distribution graph for permitting the operator to interactively specify said range on said graph whose domain is defined in said specified selection criterion.

10. A system as defined in claim 9, wherein said means for displaying a document distribution graph includes:

means for showing and locating indicators indicating said range;

means for displaying and entering numerical values that determine said range; and means for interlocking the positions of said indicators and the numerical values.

11. A system as defined in claim 9, wherein said means for displaying a document distribution graph comprises means for displaying said document distribution graph the domain of which is defined in said distance.

12. A system as defined in claim 9, wherein said means for displaying a document distribution graph comprises:

means for displaying said document distribution graph the domain of which is defined in one of the components of said feature vectors; and means for displaying and specifying said one of the components.

13. A system as defined in claim 2, wherein said evaluation means displays a record of each of said selected documents in order of said calculated distance, each record including said calculated distance, said determined membership score, said evaluated membership score if any, and an evaluated membership score setting column, in which said evaluated membership score, if exists, is displayed.

14. A system as defined in claim 13, wherein said evaluation means includes:

means for blanket setting a pattern of values in said evaluated membership score setting columns of all said selected documents; and means for selecting one of predetermined patterns for said pattern of values, said predetermined patterns including copies of said calculated membership scores, all 1's, all 0's, and clearing.

15. A system as defined in claim 13, wherein said evaluation means includes means, responsive to a selection of one of said selected documents, for displaying detailed information on said one of said selected documents including the body of said document.

16. A system as defined in claim 5, wherein said means for visually presenting information includes:

means, available in the event said predetermined selection criterions is either said distance or said selected one of the components of the feature vectors, for displaying a function selection screen to permit the operator to select one of predetermined probability distribution functions;

means for displaying a document distribution graph for permitting the operator to said interactively specify a range in the domain of graph to which range the operator desires to apply said selected probability distribution function, the number of sections into which the operator desires to divide said range and the total number of samples the operator desires to extract from said section in said range; and means for responsively extracting said total number of evaluation samples from said sections according to said selected probability distribution function.

17. A system as defined in claim 16, wherein said means for displaying a function selection screen includes means for permitting the operator to define his/her own distribution function.

18. A system as defined in claim 9, further comprising:
means, responsive to a predetermined operation by an operator, for extracting at least one key word from said selected documents;

means for displaying said at least one key word and permitting the operator to make a search condition from said at least one key word; and means for further selecting documents satisfying said search condition from said set of documents so as to enable evaluation of said further selected documents.

19. A system as defined in claim 18, wherein means for extracting at least one key word includes means, displayed on the same display screen as that of said means for specifying a range of said specified selection criterion, for enabling said predetermined operation.

20. A system as defined in claim 18, wherein means for extracting at least one key word includes means, displayed on the same display screen as that of said means for displaying a document distribution graph, for enabling said predetermined operation.

21. A system as defined in claim 1, further comprising:
means, responsive to the operator selecting one of said set of documents, for calculating a degree of similarity to each of other documents of said set;

means for displaying a first list of documents whose membership scores indicate a nonmembership of said specified category in descending order of the degree of similarity and a second list of documents whose membership scores indicate a membership of said specified category in ascending order of the degree of similarity.

22. system as defined in claim 21, wherein said means for calculating a degree of similarity includes means, displayed on the same display screen as that of said evaluation means, for enabling the user to select one of said displayed selected documents.

23. A system as defined in claim 1, further comprising:
means for storing, for each category, a list of category IDs of categories whose membership scores should be set to a specific one of possible values of the membership score if said membership score of each category is evaluated to 1, which indicates a membership of the category; and means, operative in the event the membership score of a certain document is evaluated as 1, for automatically setting the membership scores of the documents contained in said list associated with said certain document to said specific values.

24. A system as defined in claim 22, wherein each record of said category data set includes said list of category IDs for each of possible values of the membership score.

25. A system as defined in claim 1, further comprising means for displaying graphic information for comparing said calculated membership scores and previous membership scores calculated in the previous training cycle.

26. A system as defined in claim 25, wherein said means for displaying graphic information comprises means for displaying a documents distribution based on said distances such that changes in said membership scores between previous and current training cycles can be seen.

27. A system as defined in claim 25, wherein said means for displaying graphic information comprises means for separately displaying a first document distribution graph based on previously calculated distances and a second document distribution graph based on just calculated distances, wherein belonging documents whose current membership scores are 1 and not-belonging documents whose current membership scores are 0 are respectively plotted on both of said first and second document distribution graph in a visually distinguishable manner.

28. A system as defined in claim 1, further comprising:
means for calculating a value indicative of the extent to which calculated membership scores for a certain category are correct; and means for using said value for checking the quality of said parameters for said certain category.

29. A system as defined in claim 28, wherein said means for calculating a value comprises means for calculating said value by diving the number of documents whose calculated membership and said evaluated membership coincides with each other by the number of documents whose calculated membership for said certain category has been evaluated.

30. A system as defined in claim 1, further comprising analysis means for variance analyzing, with respect to a specified dimension, components of feature vectors of belonging documents whose evaluated membership scores are 1 for said specified category and components of feature vectors of not-belonging documents whose evaluated membership scores are 0 for said specified category.

31. A system as defined in claim 30, wherein said analysis means comprises:
means for displaying a first graph showing a distribution of said belonging documents and a second graph showing a distribution of said not-belonging documents, the domain of each graph is the variance of component value; and means for displaying and specifying said specified dimension for which said first and second graphs are displayed.

32. A system as defined in claim 31, wherein said analysis means comprises:
means for displaying a map of components in which one axis corresponds to the variance of specified-dimension components of said belonging documents and the other axis corresponds of said not-belonging documents;

pointing means for pointing a desired component on said map;

input means for displaying and specifying the dimension or number of a component pointed by said pointing means;

means for locking said pointing means and input means with each other.

33. A system as defined in claim 30, further comprising:
means, responsive to a predetermined operation by the operator including a specification of a category, for displaying a data table in which, for each component, usefulness data indicative of an usefulness of the component in deciding a degree of belonging to said category and at least one weight value calculated from said usefulness data;

means for specifying a desired component to be weighted; and means for weighting said desired component of said reference vector with said at least one weight value associated with said desired component.

34. A system as defined in claim 33, wherein said usefulness data comprises a first mean and a first variance of said feature vectors of said belonging documents, and a second mean and a second variance of said feature vectors of said not-belonging documents.

35. A system as defined in claim 33, wherein said means for specifying a desired component includes means, operative for a component for which said at least one weight value is smaller than a predetermined value, for giving the operator a proposal that 0 should be used as the weight value for said component.

36. A system as defined in claim 1, further comprising:
a practically used set of documents;
means for accepting a search condition from the operator and a category;
means for retrieving documents from said practically used set with said search condition and adding said retrieved documents to said set of documents.

37. A system as defined in claim 36, wherein said means for accepting a search condition includes means for marking, as a narrowing condition, a specified one of key words in said search condition, the system further comprising:
means for registering said specified key word as said narrowing condition in said record for said category in said category data set; and
means for searching said given document for said specified key word (narrowing condition);
means for setting 1 to a modified membership score of said given document only when said calculated membership score is 1 and said specified key word is found in said given document.

38. A system as defined in claim 36, further comprising:
means, operative in the event said accepted category is not found in said predetermined categories, for asking the operator if said accepted category is to be added to said predetermined categories; and
means, responsive to an affirmative answer from the operator, for adding a record of said accepted category to said category data set.

39. A system as defined in claim 33, further comprising means for permitting said operator to directly edit any of said parameters such as a component of a reference vector, a threshold value, various weight values, etc.

40. A system as defined in claim 1, further comprising:
means, operative prior to said updating said reference vector, for displaying classification results for said specified category which results will be obtained after said updating said reference vector to let said operator review said classification results; and
means for activating said means for updating said reference vector in response to a reception of an input indicative of an approval by said operator.

41. A system as defined in claim 34, wherein said at least one weight value is calculated from at least said first variance.

42. A system as defined in claim 41, wherein said first mean and said second mean are also used for the calculation of said at least one weight value.

43. A system as defined in claim 33, further comprising:
means, responsive to a predetermined command including specifications of a category and a range of weight, for displaying a weight data table which contains only records for components having been given respective weights within said range, each record including usefulness data indicative of an usefulness of the component in deciding a degree of belonging to said category and a weight value given to the component; and
means for permitting the operator to freely change said weight values.

44. A system for generating a set of parameters for use in determining whether a given document belongs to a specified one of a plurality of predetermined categories, the system comprising:
a practically used set of documents, each document having an identifier (ID);
a document data set containing a record for each document which record contains a document ID of said document and a feature vector representing features of said document in a predefined vector space;
means for randomly selecting an appropriate number of documents from said practically used set in each training cycle;
a category data set containing a record for each category which record contains a category ID of said category, a, category name and said set of parameters, said parameters including a center vector representing features of said category in said predefined vector space, data representative of a distribution of said center vector and a threshold value for use in determining whether a document belongs to the category;
means for calculating, for each document (or the document), a membership score indicative of whether the document belongs to said specified category by using a feature vector of the document, a center vector of said specified category and a threshold value for said specified category;
means for supporting an operator to input various command parameters for selecting documents for which the calculated membership scores are to be evaluated;
means, responsive to an input of one of said command parameters, for visually presenting information useful for said selection of documents to said operator; evaluation means for displaying selected documents and permitting said operator to evaluate (i.e., set an evaluated membership score as) said membership score of each of the displayed selected documents;
means for storing said evaluated membership score, if exists, of each document for each of said predetermined categories;
means for updating said reference vector of said specified category by using said evaluated membership score, if exists, of each document in said storing means, said calculated membership scores of documents having not been evaluated for said specified category and feature vectors contained in said document data set; and
means for defining a distribution of probability density along each component of the reference vector which distribution is centered at the calculated component value.

45. A system as defined ill claim 44, said means for calculating the membership score includes:
means for calculating a distance between said feature vector of each document and said reference vector of said specified category;
means for calculating said membership score from said calculated distances and said threshold; and means for calculating a degree of certainty for said calculated membership score from said distribution of probability density and said threshold.

46. A system as defined in claim 45, wherein said threshold is given as a value possible to said distance, a value possible to the standard deviation of said distance, a number of first documents in a list of documents arranged in order of said distance and a ratio of documents belonging to said category to the entire documents, said ratio including a percentage.

47. A system as defined in claim 44, wherein said means for supporting an operator includes:

means for specifying one of predetermined selection criterions; and means for specifying a range of said specified selection criterion.

48. A system as defined in claim 47, wherein said means for specifying one selection criterion comprises means for specifying one of said distance, a position in a list of documents arranged in order of said distance, a desired one of the components of said feature vectors and said degree of certainty.

49. A system for determining whether a given document belongs to a specified one of a plurality of predetermined categories with a parameter training capability, the system comprising:

a set of documents, each document having an identifier (ID);

a document data set containing a record for each document which record contains a document ID of said document and a feature vector representing features of said document in a predefined vector space;

a category data set containing a record for each category which record contains a category ID of said category, a category name and said set of parameters, said parameters including a reference vector representing features of said category in said predefined vector space and a threshold value determined for said category;

means for calculating, for a passed document, a membership score indicative of whether said passed document belongs to said specified category by using a feature vector of the document, a reference vector of said specified category and a threshold value set for said specified category;

means for supporting an operator to input various command parameters for selecting documents for which the calculated membership scores are to be evaluated;

means, responsive to an input of one of said command parameters, for visually presenting information useful for said selection of documents to said operator;

evaluation means for displaying selected documents and permitting said operator to evaluate (i.e., set an evaluated membership score as) said membership score of each of the displayed selected documents;

means for storing said evaluated membership score, if exists, of each document for each of said predetermined categories; and means for updating said reference vector of said specified category by using said evaluated membership score, if exists, of each document in said storing means, said calculated membership scores of documents having not been evaluated for said specified category and feature vectors contained in said document data set.

50. A system as defined in claim 49, further comprises:

means, in responsive to a determination that an evaluated membership score of said given document for said specified category is found in said means for storing said evaluated membership score, for providing said found evaluated membership score as an output;

means for passing said given document to said means for calculating a membership score only when an evaluated membership score of said given document for said specified category is not found in said means for storing said evaluated membership score.

51. A method of generating a set of parameters for use in determining whether a given document belongs to a specified one of a plurality of predetermined categories, the method comprising the steps of:

preparing a set of documents, each document having an identifier (ID);

preparing a document data set containing a record for each document which record contains a document ID of said document and a feature vector representing features of said document in a predefined vector space;

preparing a category data set containing a record for each category which record contains a category ID of said category, a category name and said set of parameters, said parameters including a reference vector representing features of said category in said predefined vector space and 4 threshold determined for said category;

calculating, for each document (or the document), a membership score indicative of whether the document belongs to said specified category by using a S feature vector of the document, a reference vector of said specified category and a threshold of said specified category;

supporting an operator to interactively enter various command parameters for selecting documents for which the calculated membership scores are to be evaluated;

in response to an input of one of said command parameters, visually presenting information useful for said selection of documents to said operator;

displaying selected documents and permitting said operator to enter an evaluation value to each of the displayed selected documents; and reflecting said entered evaluation values to said reference vector of said specified category.

* * * * *

UNITED STATES PATENT AND TRADEMARK OFFICE
CERTIFICATE OF CORRECTION

PATENT NO.    : 6,704,905 B2
DATED         : March 9, 2004
INVENTOR(S)   : Yoshio Fukushige et al.

It is certified that error appears in the above-identified patent and that said Letters Patent is hereby corrected as shown below:

Column 29,
Line 52, after "entire", insert -- set of --;

Column 30,
Line 44, after "if" insert -- it --;

Column 31,
Lines 2 and 3, change to read -- interactively specify a range in the domain of said graph to which range the operator desires --;
Line 45, before "system" insert -- A --;
Lines 52 and 63, change "IDs" to -- ID's --;
Line 56, after "to" insert -- be --;
Line 64, change "of possible values" to -- possible value --;

Column 32,
Line 17, change "graph" to -- graphs --;
Line 50, after "corresponds" insert -- to the variance of specified-dimension components --;
Lines 51 and 54, (each occurrence), after "pointing" insert -- to --;

Column 34,
Line 60, change "ill" to -- in --; and after "44" insert -- wherein --; and Column 36,
Line 39, delete "S".

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,704,905 B2
DATED : December 28, 2001
INVENTOR(S) : Yoshio Fukushige et al.

It is certified that error appears in the above-identified patent and that said Letters Patent is hereby corrected as shown below:

Column 29,
Lines 31 and 35, after "if" insert -- it --;

Column 34,
Lines 47 and 51, after "if" insert -- it --;

Column 35,
Line 5, after "if" insert -- it --;

Signed and Sealed this

Tenth Day of May, 2005

JON W. DUDAS
*Director of the United States Patent and Trademark Office*